US011669236B2

(12) United States Patent
Scarpino, II

(10) Patent No.: US 11,669,236 B2
(45) Date of Patent: Jun. 6, 2023

(54) CONTENT AS NAVIGATION

(71) Applicant: Microsoft Technology Licensing, LLC, Redmond, WA (US)

(72) Inventor: Luigino Scarpino, II, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 121 days.

(21) Appl. No.: 15/441,011

(22) Filed: Feb. 23, 2017

(65) Prior Publication Data

US 2018/0239525 A1 Aug. 23, 2018

(51) Int. Cl.
| G06F 3/04855 | (2022.01) |
| G06F 3/0482 | (2013.01) |
| G06F 3/04883 | (2022.01) |
| G06F 3/0485 | (2022.01) |
| G06F 3/04886 | (2022.01) |
| G06F 40/106 | (2020.01) |

(52) U.S. Cl.
CPC ........ *G06F 3/04855* (2013.01); *G06F 3/0482* (2013.01); *G06F 3/0485* (2013.01); *G06F 3/04883* (2013.01); *G06F 3/04886* (2013.01); *G06F 40/106* (2020.01); *G06F 2203/04803* (2013.01)

(58) Field of Classification Search
CPC .. G06F 3/04855; G06F 3/0482; G06F 17/212; H04N 1/00445; H04N 1/00456; H04N 1/00458
See application file for complete search history.

(56) References Cited

U.S. PATENT DOCUMENTS 7,228,492 B1 * 6/2007 Graham ............ G06F 17/30867
345/440
7,380,216 B2 * 5/2008 Feig ..................... G06F 3/04847
715/786
(Continued)

FOREIGN PATENT DOCUMENTS

| CN | 102955653 A | 3/2013 |
| CN | 104769540 A | 7/2015 |

(Continued)

OTHER PUBLICATIONS

Dockburn, et al., "Faster Document Navigation with Space-Filling Thumb nails", In Proceedings of Conference on Human Factors in Computing Systems, Apr. 22, 2006, 10 pages.
(Continued)

*Primary Examiner* — Alvin H Tan

(57) ABSTRACT

Aspects of the present disclosure relate to systems and methods for using content as navigation in an application. In one aspect, rendering of a first column including one or more content previews in a user interface to an application is initiated. Rendering of a second column including detail content corresponding to at least one of the one or more content previews in the user interface to the application is initiated. The one or more content previews and the detail content may be scrolled across the user interface when a moving input corresponding to a portion of the one or more content previews or a portion of the detail content is detected.

20 Claims, 14 Drawing Sheets

(56) References Cited

U.S. PATENT DOCUMENTS

| | | | | |
|---|---|---|---|---|
| 7,458,035 | B2* | 11/2008 | Lindemann | G06F 3/04855 348/E5.105 |
| 7,495,795 | B2* | 2/2009 | Graham | G06F 17/30017 358/1.15 |
| 8,671,344 | B2* | 3/2014 | Icho | G06F 3/0485 715/702 |
| 8,788,963 | B2* | 7/2014 | McCommons | G11B 27/036 715/784 |
| 9,519,397 | B2* | 12/2016 | Won | G06F 3/0485 |
| 10,235,020 | B2* | 3/2019 | Hawkins | G06F 3/0485 |
| 2005/0091612 | A1 | 4/2005 | Stabb et al. | |
| 2007/0143706 | A1* | 6/2007 | Peters | G06F 3/04855 715/786 |
| 2008/0104535 | A1* | 5/2008 | DeLine | G06F 3/0483 715/785 |
| 2009/0222765 | A1 | 9/2009 | Ekstrand | |
| 2010/0251165 | A1 | 9/2010 | Williams | |
| 2012/0198384 | A1 | 8/2012 | Kumamoto | |
| 2012/0266103 | A1 | 10/2012 | Shah | |
| 2013/0151974 | A1 | 6/2013 | Cho et al. | |
| 2014/0109012 | A1 | 4/2014 | Choudhary et al. | |
| 2015/0177933 | A1* | 6/2015 | Cueto | G06F 3/0483 715/776 |
| 2016/0299657 | A1 | 10/2016 | Howarth et al. | |

FOREIGN PATENT DOCUMENTS

| | | |
|---|---|---|
| CN | 105353959 A | 2/2016 |
| EP | 2703987 A2 | 3/2014 |

OTHER PUBLICATIONS

Hoeben, et al., "Flicking through Page-based Documents with Thumbnail Sliders and Electronic Dog-ears", In Proceedings of Conference on Human Factors in Computing Systems, Apr. 1, 2000, 2 pages.

"International Search Report and Written Opinion Issued in PCT Application No. PCT/US18/018458", dated May 29, 2018, 11 Pages.

"Office Action Issued in European Patent Application No. 18707605.4", dated Sep. 3, 2021, 5 Pages.

"First Office Action and Search Report Issued in Chinese Patent Application No. 201880013615.4", dated Mar. 31, 2022, 19 Pages.

"Notice of Allowance Issued in European Patent Application No. 18707605.4", dated Jan. 11, 2023, 6 Pages.

Nuo, et al., "Design and Implementation of Highly usable and Customizable Web Application User Interface", In Journal of Computer Engineering and Design, vol. 26, Issue 4, Apr. 28, 2005, 2 Pages.

Tao, Xiu, "Innovation Design of Webpage Interface Based on "Waterfall Flow Layout"", In Journal of Design Research, vol. 3, Issue 2, Feb. 28, 2013, 2 Pages.

"Second Office Action and Search Report Issued in Chinese Patent Application No. 201880013615.4", dated Feb. 14, 2023, 7 Pages.

Chen, et al., "A New Controller Controlling the Synchronous Communication between Different Chua's Circuits", In Proceedings of the International Asia Conference on Informatics in Control, Automation and Robotics, Feb. 1, 2009, pp. 57-61.

* cited by examiner

CONTENT AS NAVIGATION

BACKGROUND

Computer and software users have grown accustomed to user-friendly software applications for interacting with and/or navigating content within files, documents, messages, browsers, and the like. For example, applications may include word processing applications, spreadsheet applications, electronic slide presentation applications, email applications, chat applications, voice applications, and the like. Current techniques for navigating within and/or around an application include utilizing user interface elements and/or chrome such as scroll bars and sliders that are separate from the content of the application itself. As such, current techniques for navigating content of an application require utilizing display space for user interface elements and chrome and make navigation of content difficult and inefficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for using content as navigation in an application. In one aspect, rendering of a first column including one or more content previews in a user interface to an application is initiated. Rendering of a second column including detail content corresponding to at least one of the one or more content previews in the user interface to the application is initiated. The one or more content previews and the detail content may be scrolled across the user interface when a moving input corresponding to a portion of the one or more content previews or a portion of the detail content is detected.

In another aspect, a first column comprising one or more content previews may be displayed as a first scroll bar in a user interface to the application. A second column comprising detail content may be displayed as a second scroll bar in the user interface to the application. In one example, the second column is displayed adjacent to the first column. In response to receiving a moving input corresponding to a portion of the first scroll bar, the one or more content previews and the detail content may be scrolled across the user interface.

In yet another aspect, an application comprises a first scroll bar through which to display one or more content previews in a user interface to the application. The application may further comprise a second scroll bar through which to display detail content corresponding to at least one of the one or more content previews in the user interface to the application. The application may further comprise a third scroll bar through which to display neutral content in the user interface to the application.

DESCRIPTION OF THE DRAWINGS

The detailed description is made with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
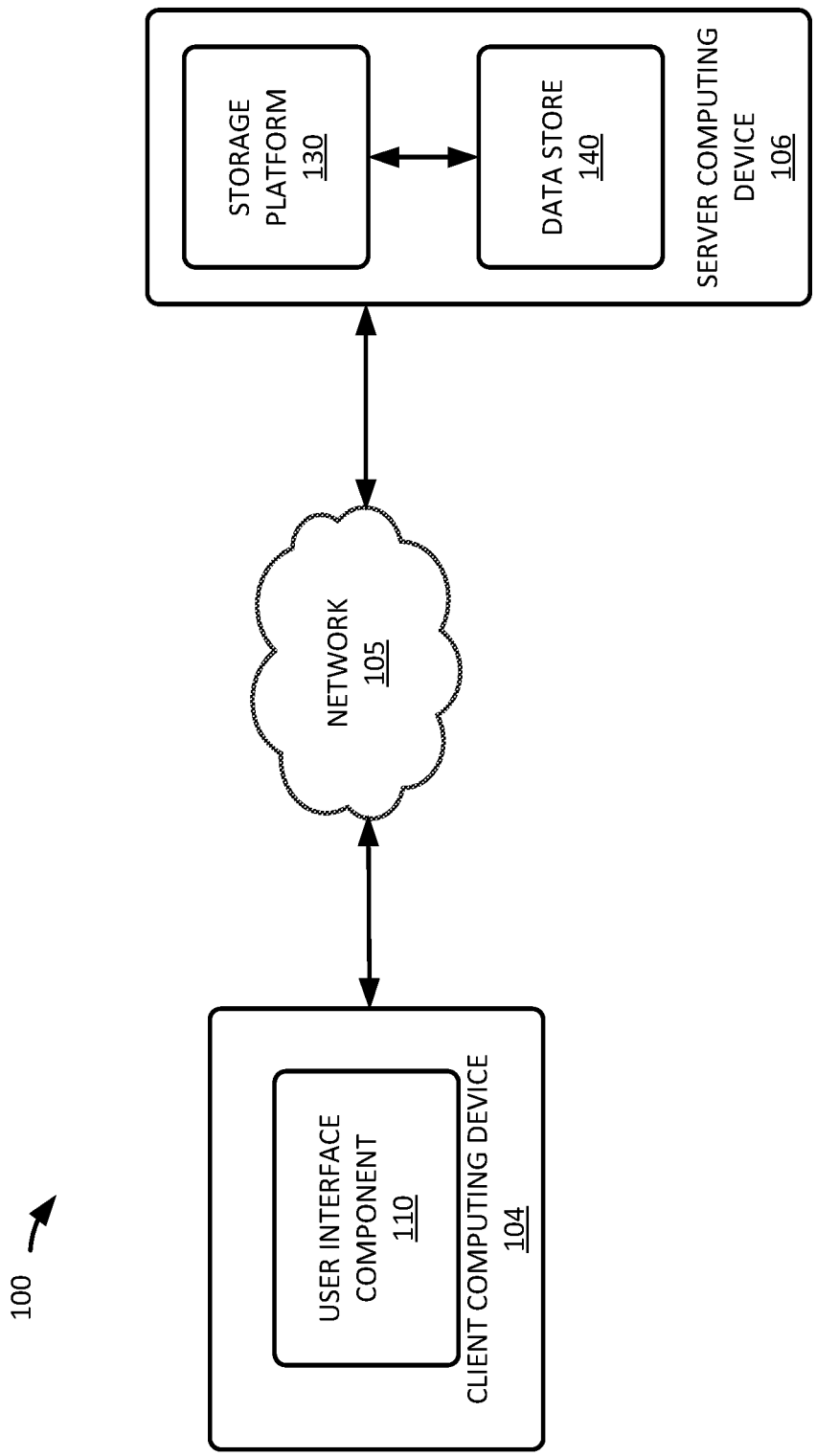
FIG. 1 illustrates an exemplary content navigation system for using content as navigation in an application, according to an example aspect.

Aspects of the disclosure are generally directed to using content as navigation in an application. For example, content of an application such as a word processing application, spreadsheet application, electronic slide presentation application, email application, chat application, voice application, a browser application, and the like, may be used as a slider and/or scroll bar to navigate the content of the application. That is, the content itself may be used as a slider and/or scroll bar. In one example, a column of content previews within the application may be used to quickly and efficiently scroll through larger detail content. In one example, the larger detail content is displayed in a column adjacent to the column with the content previews. In another example, the larger detail content corresponds to the preview content. For example, the larger detail content may include the same content as the content previews. In this regard, the larger detail content may be a larger view of the content previews. In some examples, an additional column of medium size neutral content may be included within the application. The medium size neutral content may be larger than the preview content and smaller than the larger detail content. In one example, the medium size neutral content may be displayed adjacent to the detail content. In some examples, any of the medium size neutral content, larger detail content, and smaller preview content may be used to quickly and efficiently scroll and/or navigate through the content of the application. In this regard, the user interface display to the application may include more space for content.

As discussed above, current techniques for navigating within and/or around an application include utilizing user interface elements and/or chrome such as scroll bars and sliders that are separate from the content of the application itself. As such, current techniques for navigating content of an application require utilizing display space for user interface elements and chrome and make navigation of content difficult and inefficient. Accordingly, aspects described herein include techniques that make navigation of content intuitive, user-friendly, and efficient and provide more display space for the content. In one aspect, rendering of a first column including one or more content previews in a user interface to an application may be initiated. In one example, the first column including the one or more content previews may be displayed and/or rendered as a first scroll bar in the user interface to the application. For example, the one or more content previews and/or a portion of the one or more content previews may be scrolled across the user interface using the one or more content previews itself. For example, the content may be moved across (e.g., up, down, right, and left) the user interface display to the application such that new content is viewable in the user interface as old content is no longer viewable (e.g., disappears) in the user interface.

In some aspects, rendering of a second column including detail content corresponding to at least one of the one or more content previews in the user interface to the application may be initiated. In one example, the second column including detail content may be displayed and/or rendered as a second scroll bar in the user interface to the application. For example, the detail content and/or a portion of the detail content may be scrolled across the user interface using the detail content itself. In another example, the detail content and/or a portion of the detail content may be scrolled across the user interface using the one or more content previews and/or a portion of the one or more content previews. In another example, the one or more content previews and/or a portion of the one or more content previews may be scrolled across the user interface using the detail content. In one example, the one or more content previews and the detail content may be scrolled across the user interface when a moving input corresponding to a portion of the one or more content previews or a portion of the detail content is detected (e.g., by the user interface). In one example, the second column is displayed adjacent to the first column. In one case, a portion of the detail content may correspond to at least two of the one or more content previews. For example, the detail content may include at least two or three items displayed in the user interface simultaneously. In this regard, each item of the at least two or three items displayed in the user interface simultaneously may correspond to one of the one or more content previews.

In yet another aspect, an application may include a first scroll bar through which to display one or more content previews in a user interface to the application. The application may further include a second scroll bar through which to display detail content corresponding to at least one of the one or more content previews in the user interface to the application. The application may further include a third scroll bar through which to display neutral content in the user interface to the application. In one example, the detail content is displayed between the neutral content and the one or more content previews. In another example, the detail content is larger than the neutral content and the one or more content previews, and the neutral content is larger than the one or more content previews. In this regard, a user may view the same content in three different columns and in three different sizes. In one case, any of the one or more content previews, neutral content, and detail content may be used to scroll the content across the user interface. For example, in response to receiving a moving input corresponding to a portion of at least one of the first scroll bar, the second scroll bar, and the third scroll bar, the one or more content previews, the detail content, and the neutral content may be scrolled across the user interface (e.g., up, down, right, and left). In one example, the moving input is in a vertical direction. In this regard, the content may be scrolled up or down. In another example, the moving input is in a horizontal direction. In this regard, the content may be scrolled right or left. In one case, the first scroll bar includes a content preview scroll speed, the second scroll bar includes a detail content scroll speed, and the third scroll bar includes a neutral content scroll speed. In this regard, the one or more content previews, the detail content, and the neutral content may be scrolled at different speeds across the user interface. In one example, user preference options may be displayed in a scroll speed menu for tuning the content preview scroll speed, the detail content scroll speed, and the neutral content scroll speed.

As such, a technical effect that may be appreciated is that utilizing content itself as a navigation tool without requiring additional user interface elements and chrome for navigation reduces processor load and conserves memory. Another technical effect that may be appreciated is that users of an application may quickly, easily, and efficiently navigate content within applications using a functional surface. Yet another technical effect that may be appreciated is that providing additional display space for content facilitates a compelling visual and functional experience to allow a user to efficiently interact with a user interface for navigating content within applications.

Referring now to the drawings, in which like numerals represent like elements through the several figures, aspects of the present disclosure and the exemplary operating environment will be described. With reference to FIG. 1, one aspect of a content navigation system 100 for using content as navigation in an application is illustrated. The content navigation system 100 may include a client computing device 104 and a server computing device 106. In aspects, the content navigation system 100 may be implemented on the client computing device 104. In a basic configuration, the client computing device 104 is a handheld computer having both input elements and output elements. The client computing device 104 may be any suitable computing device for implementing the content navigation system 100 for using content as navigation in an application. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for implementing the content navigation system 100 for using content as navigation in an application may be utilized.

In aspects, the content navigation system 100 may be implemented on the server computing device 106. The server computing device 106 may provide data to and from the client computing device 104 through a network 105. In aspects, the content navigation system 100 may be implemented on more than one server computing device 106, such as a plurality of server computing devices 106. As discussed above, the server computing device 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the content navigation system 100 may include the client computing device 104 and the server computing device 106. The various components may be implemented using hardware, software, or a combination of hardware and software. In aspects, the client computing device 104 may include a user interface component 110. The user interface component 110 may facilitate navigating content in an application. For example, the user interface component 110 may initiate rendering of a first column including one or more content previews in a user interface to an application of the client computing device 104. In one example, an application may include any application suitable for rendering content such as a word processing application, spreadsheet application, electronic slide presentation application, email application, chat application, voice application, browser application, and the like. In one example, the content of the application may include items such as files, folders, web pages, links to external resources, rich media (e.g., images, pictures, and video), tasks, text, emails, and the like. In this regard, the one or more content previews may include previews of items such as files, folders, web pages, links to external resources, rich media (e.g., images, pictures, and video), tasks, text, emails, and the like. In one example, the first column may be rendered in a right position in the user interface to the application. In another example, the first column may be rendered in a center position in the user interface to the application. In yet another example, the first column may be rendered in a left position in the user interface to the application.

In one example, the first column including the one or more content previews may include a content preview scroll speed. The content preview scroll speed may be the speed at which the one or more content previews are scrolled across the user interface (e.g., via the user interface component 110). For example, in response to a user input corresponding to a portion of the one or more content previews (e.g., an input received at any position within the first column), the one or more content previews may be scrolled up, down, right, or left. In one example, the input may include a moving input. In one example, a moving input may include a touch gesture such as tapping the screen and swiping in a direction across the screen. In another example, a moving input may include contacting the screen using a cursor, for example. In this regard, contact may include placing a cursor on the user interface using a device such as a mouse and moving the cursor in a direction across the screen.

In another example, the user interface component 110 may initiate rendering of a second column including detail content corresponding to at least one of the one or more content previews in the user interface to the application of the client computing device 104. The detail content may include a detailed, large version of content and/or items such as files, folders, web pages, links to external resources, rich media (e.g., images, pictures, and video), tasks, text, emails, and the like. In one example, the detail content corresponds to the one or more content previews. For example, if one of the content previews includes an image, the detail content corresponding to that content preview is a larger, detailed version of the image in the content preview. In one example, the second column may be rendered in a right position in the user interface to the application. In another example, the second column may be rendered in a center position in the user interface to the application. In yet another example, the second column may be rendered in a left position in the user interface to the application. In one example, the second column is rendered adjacent to the first column. In this regard, a user may easily view the detail content next to/adjacent to the one or more content previews.

In one example, the second column including the detail content may include a detail content scroll speed. The detail content scroll speed may be the speed at which the detail content is scrolled across the user interface (e.g., via the user interface component 110). For example, in response to a user input corresponding to a portion of the detail content (e.g., an input received at any position within the second column), the detail content may be scrolled up, down, right, or left. In one example, the input may include a moving input. In one example, a moving input may include a touch gesture such as tapping the screen and swiping in a direction across the screen. In another example, a moving input may include contacting the screen using a cursor, for example. In this regard, contact may include placing a cursor on the user interface using a device such as a mouse and moving the cursor in a direction across the screen. In one example, the one or more content previews (e.g., the first column) and the detail content (e.g., the second column) may be scrolled across the user interface when a moving input corresponding to a portion of the one or more content previews or a portion of the detail content is detected. For example, both the one or more content previews and the detail content may be scrolled when a moving input corresponding to either the first column or the second column is detected. In one example, the content preview scroll speed is four times the detail content scroll speed. For example, the one or more content previews may scroll across the user interface four times as fast as the detail content scrolls across the user interface. In another example, the content preview scroll speed is two times the detail content scroll speed. For example, the one or more content previews may scroll across the user interface twice as fast as the detail content scrolls across the user interface. In another example, the content preview scroll speed is half the detail content scroll speed. For example, the one or more content previews may scroll across the user interface at half the speed as the detail content scrolls across the user interface.

In one case, the content preview scroll speed and the detail content scroll speed are tunable such that the interrelationship between the content preview scroll speed and the detail content scroll speed may be adjusted. It is appreciated that the content preview scroll speed and the detail content scroll speed are tunable to any interrelationship and/or speed. In this regard, the user interface component 110 may display user preference options in a scroll speed menu for tuning at least the content preview scroll speed and the detail content scroll speed. In one example, the user preference options may include a plurality of speeds for each of the content preview scroll speed and the detail content scroll speed such that the scroll speed may be set for the one or more content previews and the detail content along with the interrelationship between the two scrolls speeds.

In another example, the user interface component 110 may initiate rendering of a third column including neutral content in the user interface to the application of the client computing device 104. The neutral content may include a medium and/or neutral version of content and/or items such as files, folders, web pages, links to external resources, rich media (e.g., images, pictures, and video), tasks, text, emails, and the like. In one example, the neutral content corresponds to at least one of the one or more content previews and at least a portion of the detail content. For example, if one of the content previews includes text, the neutral content corresponding to that content preview is a medium sized version of the text in the content preview (e.g., the neutral content is larger than the content preview). In another example, if a portion of and/or an item included in the detail content includes a link, the neutral content corresponding to that portion of the detail content is a medium sized version of the link in the detail content (e.g., the neutral content is smaller than the detail content). In one example, the third column may be rendered in a right position in the user interface to the application. In another example, the third column may be rendered in a center position in the user interface to the application. In yet another example, the third column may be rendered in a left position in the user interface to the application. In one example, the third column is rendered adjacent to the second column. In this regard, a user may easily view the neutral content next to/adjacent to the detail content.

In one example, the third column including the neutral content may include a neutral content scroll speed. The neutral content scroll speed may be the speed at which the neutral content is scrolled across the user interface (e.g., via the user interface component 110). For example, in response to a user input corresponding to a portion of the neutral content (e.g., an input received at any position within the third column), the neutral content may be scrolled up, down, right, or left. In one example, the input may include a moving input. In one example, a moving input may include a touch gesture such as tapping the screen and swiping in a direction across the screen. In another example, a moving input may include contacting the screen using a cursor, for example. In this regard, contact may include placing a cursor on the user interface using a device such as a mouse and moving the cursor in a direction across the screen. In one example, the one or more content previews (e.g., the first column), the detail content (e.g., the second column), and the neutral content (e.g., the third column) may be scrolled across the user interface when a moving input corresponding to a portion of the one or more content previews, a portion of the detail content, or a portion of the neutral content is detected. For example, the one or more content previews, the detail content, and the neutral content may be scrolled when a moving input corresponding to any of the first column, the second column or the third column is detected. In one example, the content preview scroll speed is two times the neutral content scroll speed and the detail content scroll speed is half the neutral content scroll speed. For example, the one or more content previews may scroll across the user interface two times as fast as the neutral content scrolls across the user interface and the detail content may scroll across the use interface at half the scroll speed as the neutral content scrolls across the user interface.

In one case, the content preview scroll speed, the detail content scroll speed, and the neutral content scroll speed are tunable such that the interrelationship between the content preview scroll speed, the detail content scroll speed, and the neutral content scroll speed may be adjusted. It is appreciated that the content preview scroll speed, the detail content scroll speed, and the neutral content scroll speed are tunable to any interrelationship and/or speed. In this regard, the user interface component 110 may display user preference options in a scroll speed menu for tuning the content preview scroll speed, the detail content scroll speed, and the neutral content scroll speed. In one example, the user preference options may include a plurality of speeds for each of the content preview scroll speed, the detail content scroll speed, and the neutral content scroll speed such that the scroll speed may be set for the one or more content previews, the detail content, and the neutral content along with the interrelationship between the three scrolls speeds.

In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

In some aspects, the server computing device 106 may include a storage platform 130 and the data store 140. In one example, the storage platform 130 may be configured to store, manage, and access data and/or information associated with the content navigation system 100. For example, the storage platform 130 may store content as described herein in a data store 140. In one example, data store 140 may be part of and/or located at the storage platform 130. In another example, data store 140 may be a separate component and/or may be located separate from the storage platform 130. It is appreciated that although one server computing device 106 is illustrated in FIG. 1, the content navigation system 100 may include a plurality of server computing devices 106 with a plurality of storage platforms 130 and a plurality of data stores 140. In some cases, the server computing device 106 may include a plurality of storage platforms 130 and a plurality of data stores 140. For example, the plurality of storage platforms 130 may include at least file storage providers, external activity services and document editing clients. In one example, the storage platform 130 may be a cloud storage service such as OneDrive, SharePoint, Google Drive, Dropbox, and the like.

Figure 2A:
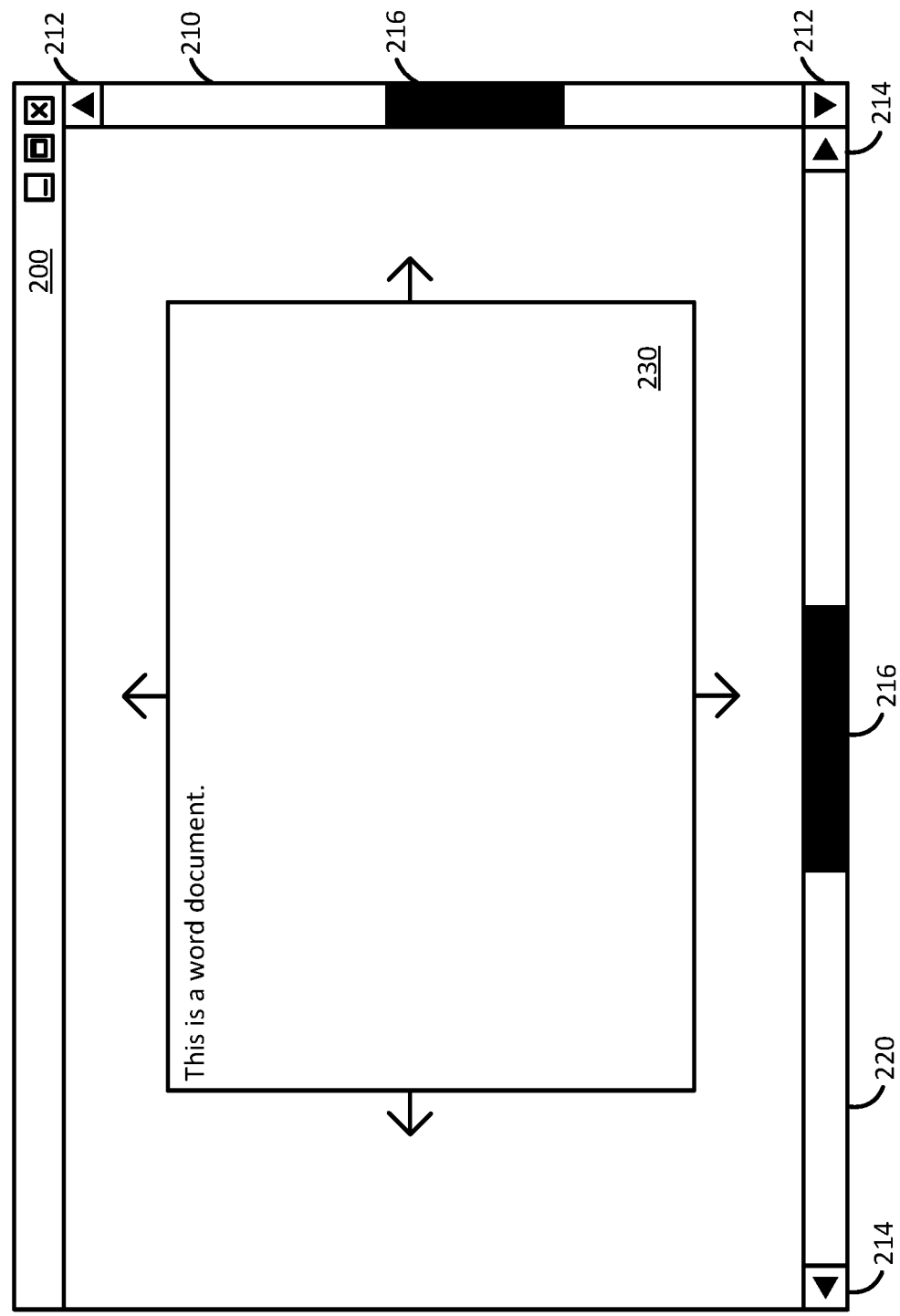
FIG. 2A illustrates one view in a progression of views an application displayed in a user interface of a client computing device, according to an example aspect.

Referring now to FIG. 2A, one view 200A in a progression of views of an application 200 displayed on a user interface of the client computing device 104, such as a desktop computer, tablet computer or a mobile phone, for example, is shown. The exemplary application, as shown in FIG. 2A, is a word processing application. The view 200A of the word processing application 200 is an example of a view a user may encounter when interacting with the word processing application 200. In particular, the view 200A of the word processing application 200 illustrates at least one prior technique for navigating content within an application. For example, the view 200A of the word processing application 200 includes content 230 (e.g., a file), a vertical scroll bar 210, and a horizontal scroll bar 220. The vertical scroll bar 210 may include vertical scroll arrows 212 and a slider 216. The horizontal scroll bar 220 may include horizontal scroll arrows 214 and the slider 216. In this regard, a user may use the vertical scroll bar 210 (e.g., by utilizing either the slider 216 or the vertical scroll arrows 212) to scroll the file 230 in a vertical direction (e.g., up or down). A user may use the horizontal scroll bar 220 (e.g., by utilizing either the slider 216 or the horizontal scroll arrows 214) to scroll the file 230 in a horizontal direction (e.g., right or left). As such, FIG. 2A illustrates a prior technique for navigating content in an application.

Figure 2B:
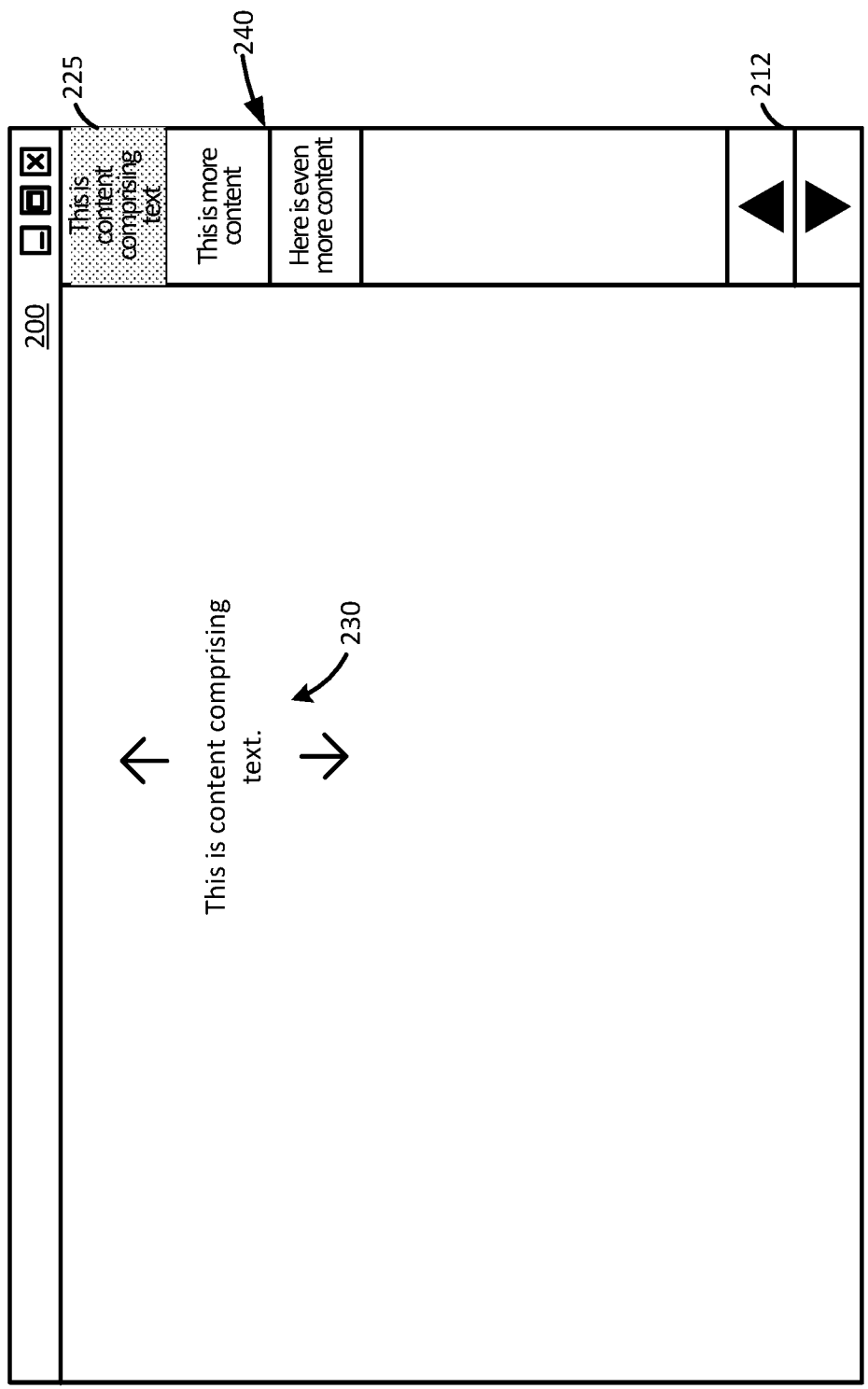
FIG. 2B illustrates another view in a progression of views of the application of FIG. 2A, according to an example aspect.

Referring now to FIG. 2B, another view 200B in a progression of views of the application of FIG. 2A, according to an example aspect is shown. The view 200B of the word processing application 200 is an example of a view a user may encounter when interacting with the word processing application 200. In particular, the view 200B of the word processing application 200 illustrates at least one prior technique for navigating content within an application. For example, the view 200B of the word processing application 200 includes content 230 (e.g., text), the vertical scroll arrows 212, preview content 240, and a preview content window 225. In this example, a user may use the vertical scroll arrows 212 to scroll the preview content window 225 in a vertical direction (e.g., up or down) such that the preview content window 225 moves over different portions of the preview content 240. In this regard, the portion of the preview content 240 that has the preview content window 225 over it is the content 230 that is displayed in application 200. For example, as illustrated in FIG. 2B, the preview content window 225 is over the portion of the preview content 240 that includes the text, "This is content comprising text". As such, the content 230 includes the text, "This is the content comprising text". As a user moves the preview content window 225 using the vertical scroll arrows 212 (or by direct contact with the preview content window 225), the content 230 is scrolled in a vertical direction to match the preview content 240 that has the preview content window 225 over it. In this regard, the preview content 240 itself is not scrolled or moved. In contrast, the preview content window 225 is moved. As such, FIG. 2B illustrates a prior technique for navigating content in an application.

Figure 3A:
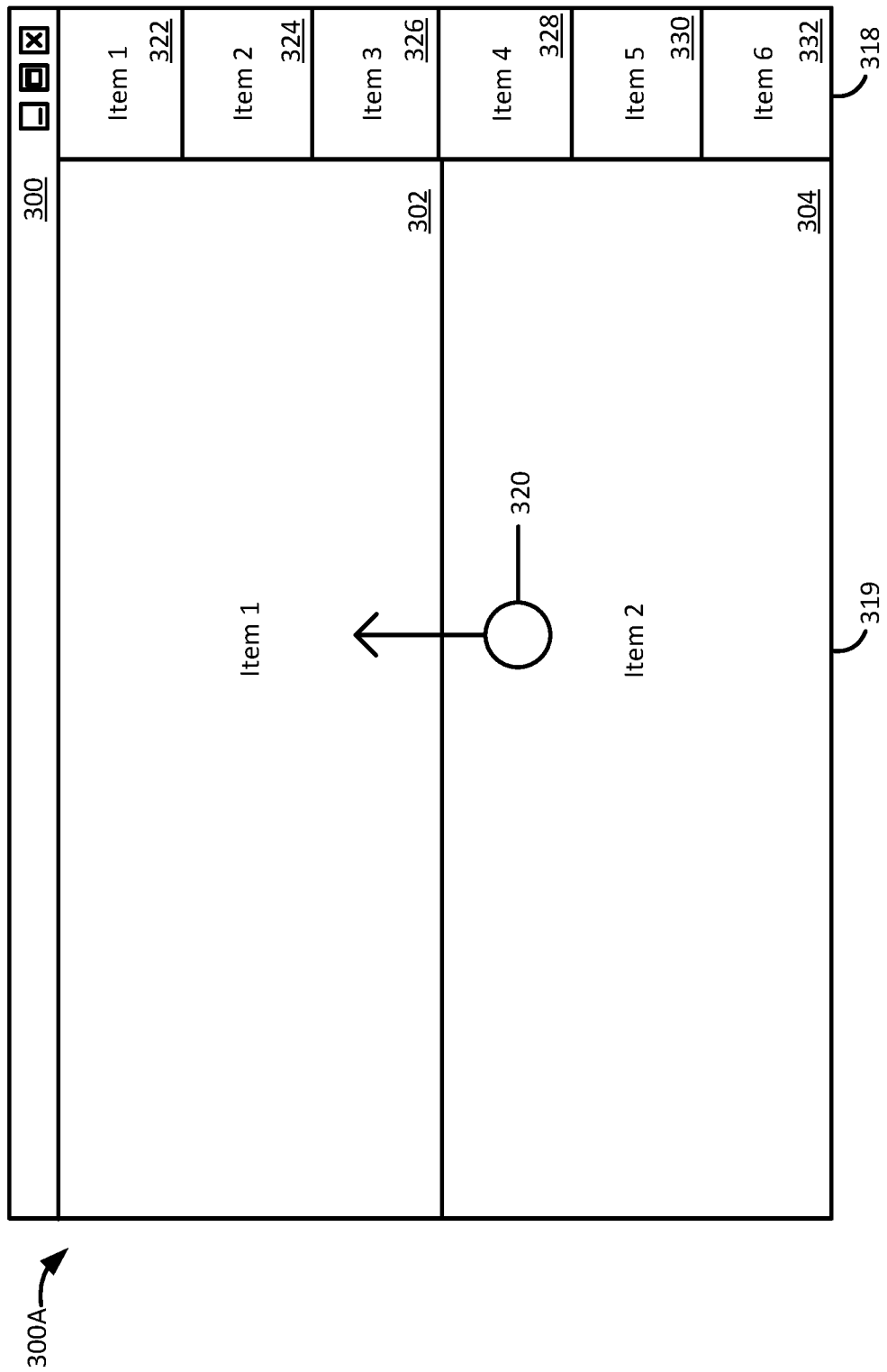
FIG. 3A illustrates one view in a progression of views an application displayed in a user interface of a client computing device, according to an example aspect.

FIG. 3A illustrates one view 300A in a progression of views of an application 300 displayed in a user interface of the client computing device 104, such as a desktop computer, tablet computer or a mobile phone, for example. The view 300A of the application 300 is an example of a view a user may encounter when interacting with the application 300. As discussed above herein, the application 300 may include an application such as a word processing application, spreadsheet application, electronic slide presentation application, email application, chat application, voice application, a browser application, and the like. As illustrated, the exemplary view 300A of the application 300 includes a first column 318 and a second column 319. The second column 319 is displayed and/or rendered adjacent to the first column 318. In the example illustrated in FIG. 3A, the first column 318 includes one or more content previews 322, 324, 326, 328, 330, and 332. The first content preview 322 may include item 1, the second content preview 324 may include item 2, the third content preview 326 may include item 3, the fourth content preview 328 may include item 4, the fifth content preview 330 may include item 5, and the sixth content preview 332 may include item 6. The one or more content previews 322, 324, 326, 328, 330, and 332 (e.g., items 1, 2, 3, 4, 5, and 6) may include any type of content described herein such as files, folders, web pages, links to external resources, rich media (e.g., images, pictures, and video), tasks, text, emails, and the like.

In the example illustrated in FIG. 3A, the second column 319 includes detail content 302 and 304. The detail content 302 may include item 1 and the detail content 304 may include item 2. The detail content 302, 304 (e.g., items 1 and 2) may include any type of content described herein such as files, folders, web pages, links to external resources, rich media (e.g., images, pictures, and video), tasks, text, emails, and the like. In one example, the detail content 302 corresponds to the first content preview 322 and the detail content 304 corresponds to the second content preview 324. In this regard, the detail content 302 is a larger, more detailed version of the first content preview 322 and the detail content 304 is a larger, more detailed version of the second content preview 324. In the example illustrated in FIG. 3A, at least a portion of the detail content (e.g., 302, 304) corresponds to at least two of the one or more content previews (e.g., 322, 324). As illustrated in FIG. 3A, an input 320 corresponding to a portion of the detail content 304 may be received. In the example illustrated in FIG. 3A, the input is a moving input in a vertical direction (e.g., a swiping gesture going up). When the moving input 320 corresponding to a portion of the detail content 304 is detected, the one or more content previews 322, 324, 326, 328, 330, and 332 (e.g., items 1, 2, 3, 4, 5, and 6) and the detail content 302, 304 (e.g., items 1 and 2) are scrolled across the user interface to the application 300, as illustrated in FIG. 3B.

Figure 3B:
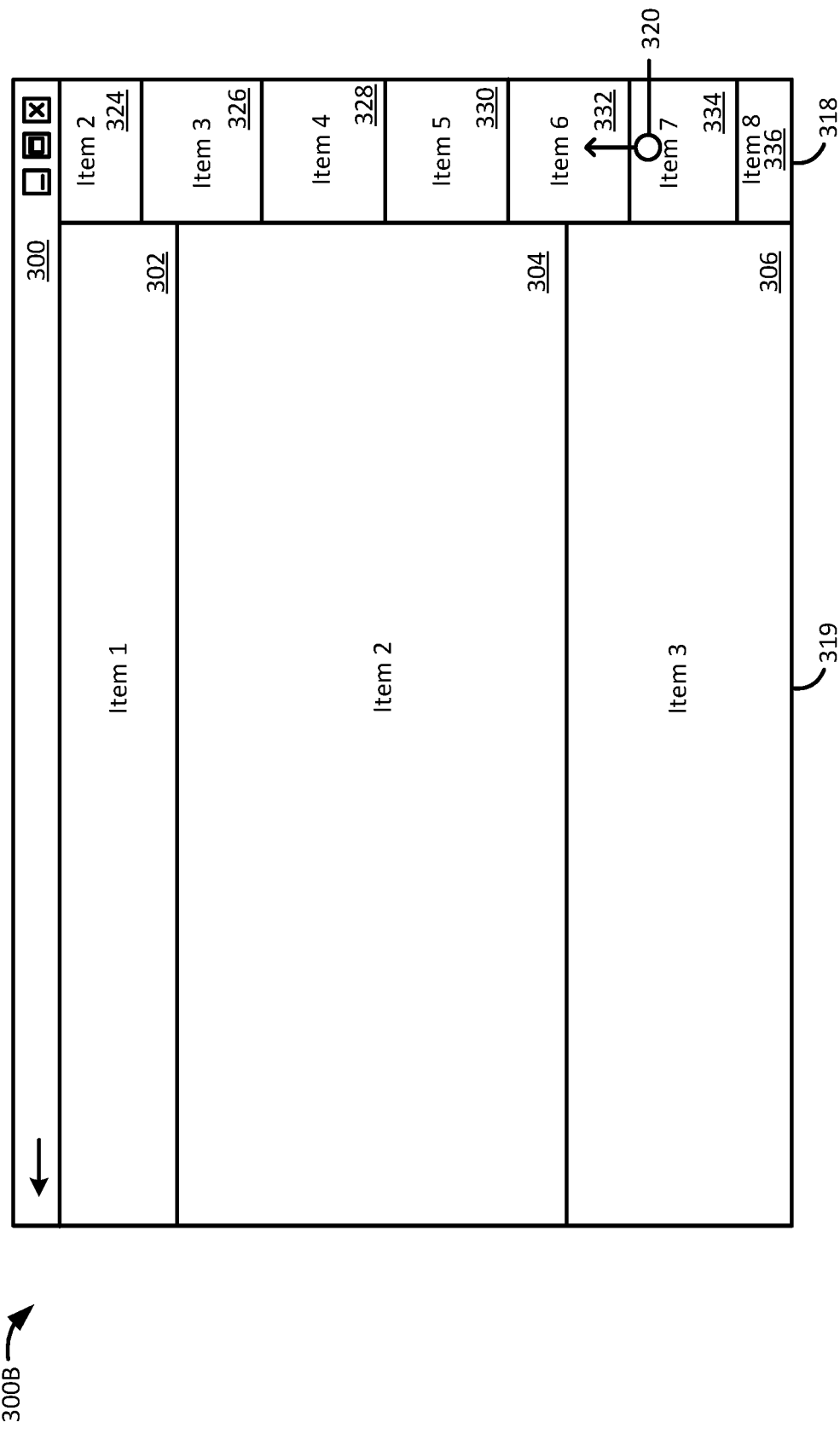
FIG. 3B illustrates another view in a progression of views of the application of FIG. 3A, according to an example aspect.

FIG. 3B illustrates another view 300B in a progression of views of the application 300 of FIG. 3A, displayed in a user interface of the client computing device 104, such as a desktop computer, tablet computer or a mobile phone, for example. The view 300B of the application 300 is an example of a view a user may encounter when interacting with the application 300. As illustrated, the exemplary view 300B of the application 300 includes the first column 318 and the second column 319. In the example illustrated in FIG. 3B, the first column 318 includes one or more content previews 324, 326, 328, 330, 332, 334, and 336. The one or more content previews 324, 326, 328, 330, and 332 are the same content previews illustrated and described relative to FIG. 3A. The first column 318 includes additional content previews 334 and 336. Content preview 334 includes item 7 and content preview 336 includes item 8. As such, a portion of the one or more content previews has been scrolled across the user interface to the application 300 such that new content (e.g., content previews 334, 336) is viewable in the user interface as old content (e.g., content preview 322) is no longer viewable in the user interface. The content previews 334, 336 (e.g., items 7, 8) may include any type of content described herein such as files, folders, web pages, links to external resources, rich media (e.g., images, pictures, and video), tasks, text, emails, and the like.

In the example illustrated in FIG. 3B, the second column 319 includes detail content 302, 304, and 306. The detail content 302 and 304 is the same detail content illustrated and described relative to FIG. 3A. The second column 319 includes additional detail content 306. The detail content 306 includes item 3. The detail content 306 (e.g., item 3) may include any type of content described herein such as files, folders, web pages, links to external resources, rich media (e.g., images, pictures, and video), tasks, text, emails, and the like. As described relative to FIG. 3A, in one example, the detail content 302 corresponds to the first content preview 322 and the detail content 304 corresponds to the second content preview 324. In another example, the detail content 306 corresponds to the third content preview 326. In this regard, the detail content 306 is a larger, more detailed version of the third content preview 326. In the example illustrated in FIG. 3B, at least a portion of the detail content (e.g., 302, 304, 306) corresponds to at least three of the one or more content previews (e.g., 322, 324, 326).

In some examples, a portion of the one or more content previews and/or a portion of the detail content may be viewable while a portion of the one or more content previews and/or a portion of the detail content may not be viewable. For example, as illustrated in FIG. 3B, a portion of the detail content 302 is viewable while a portion of the detail content 302 is not viewable and a portion of the detail content 306 is viewable while a portion of the detail content 306 is not viewable. As further illustrated in FIG. 3B, a portion of the content preview 324 is viewable while a portion of the content preview 324 is not viewable and a portion of the content preview 336 is viewable while a portion of the content preview 336 is not viewable. As illustrated in FIG. 3B, an input 320 corresponding to a portion of the content preview 334 may be received. In the example illustrated in FIG. 3B, the input is a moving input in a vertical direction (e.g., a swiping gesture going up). When the moving input 320 corresponding to a portion of the content preview 334 is detected, the one or more content previews 324, 326, 328, 330, 332, 334, and 336 (e.g., items 2, 3, 4, 5, 6, 7, and 8) and the detail content 302, 304, 306 (e.g., items 1, 2, and 3) are scrolled across the user interface to the application 300, as illustrated in FIG. 3C.

Figure 3C:
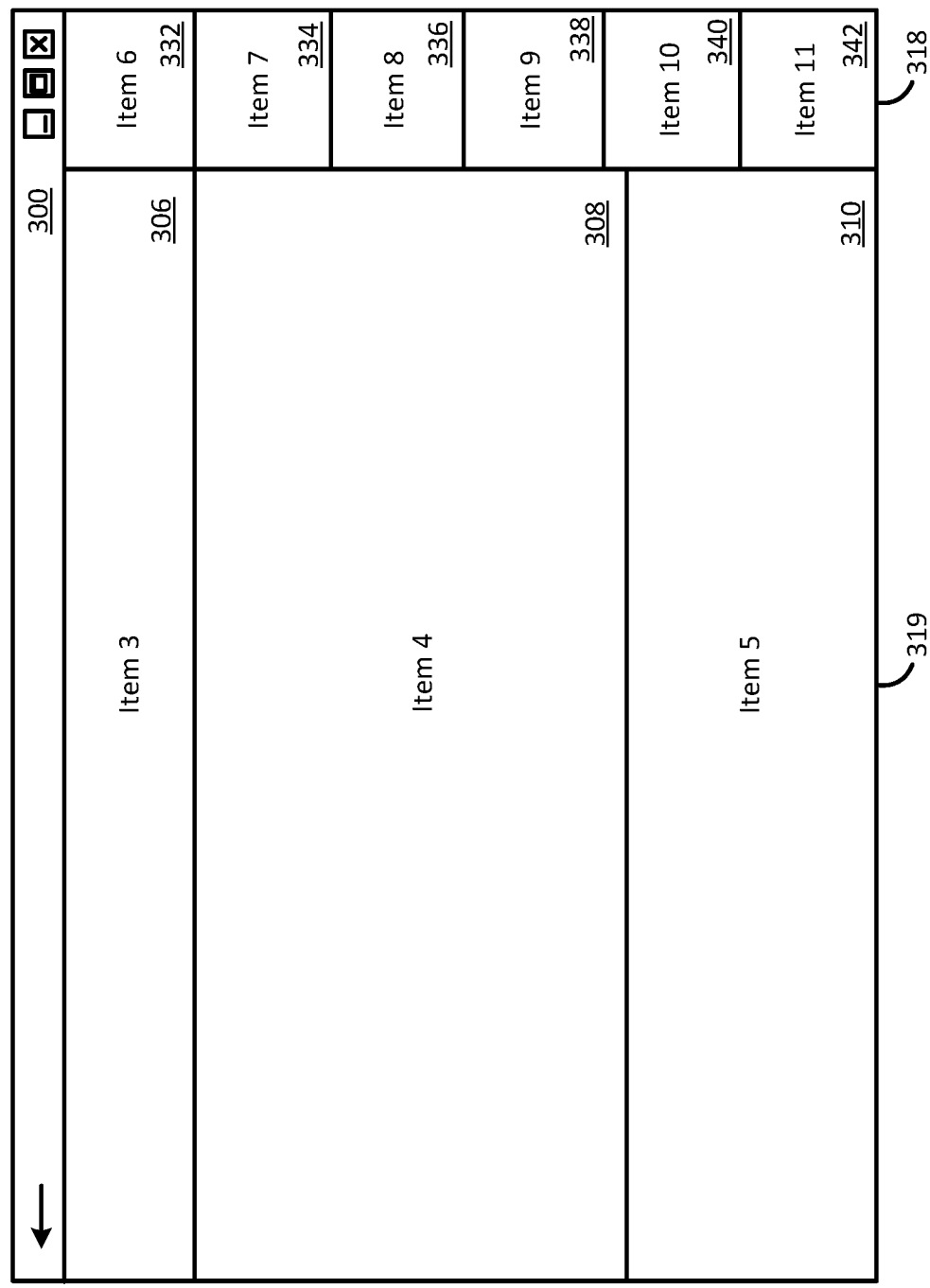
FIG. 3C illustrates another view in the progression of views of the application of FIG. 3A, according to an example aspect.

FIG. 3C illustrates another view 300C in a progression of views of the application 300 of FIG. 3A, displayed in a user interface of the client computing device 104, such as a desktop computer, tablet computer or a mobile phone, for example. The view 300C of the application 300 is an example of a view a user may encounter when interacting with the application 300. As illustrated, the exemplary view 300C of the application 300 includes the first column 318 and the second column 319. In the example illustrated in FIG. 3C, the first column 318 includes one or more content previews 332, 334, 336, 338, 340, and 342. The one or more content previews 332, 334, and 336 are the same content previews illustrated and described relative to FIG. 3B. The first column 318 includes additional content previews 338, 340, and 342. Content preview 338 includes item 9, content preview 340 includes item 10, and content preview 342 includes item 11. As such, a portion of the one or more content previews has been scrolled across the user interface to the application 300 such that new content (e.g., content previews 338, 340, 342) is viewable in the user interface as old content (e.g., content preview 324, 326, 328, 330) is no longer viewable in the user interface. The content previews 338, 340, and 342 (e.g., items 9, 10, 11) may include any type of content described herein such as files, folders, web pages, links to external resources, rich media (e.g., images, pictures, and video), tasks, text, emails, and the like.

In the example illustrated in FIG. 3C, the second column 319 includes detail content 306, 308, and 310. The detail content 306 is the same detail content illustrated and described relative to FIG. 3B. The second column 319 includes additional detail content 308 and 310. The detail content 308 includes item 4 and the detail content 310 includes item 5. As such, a portion of the detail content has been scrolled across the user interface to the application 300 such that new content (e.g., detail content 308 and 310) is viewable in the user interface as old content (e.g., detail content 302 and 304) is no longer viewable in the user interface. The detail content 308 and 310 (e.g., items 4, 5) may include any type of content described herein such as files, folders, web pages, links to external resources, rich media (e.g., images, pictures, and video), tasks, text, emails, and the like. In one example, the detail content 308 corresponds to the fourth content preview 328 and the detail content 310 corresponds to the fifth content preview 330. In this regard, the detail content 308 is a larger, more detailed version of the fourth content preview 328 and the detail content 310 is a larger, more detailed version of the fifth content preview 330.

Figure 4A:
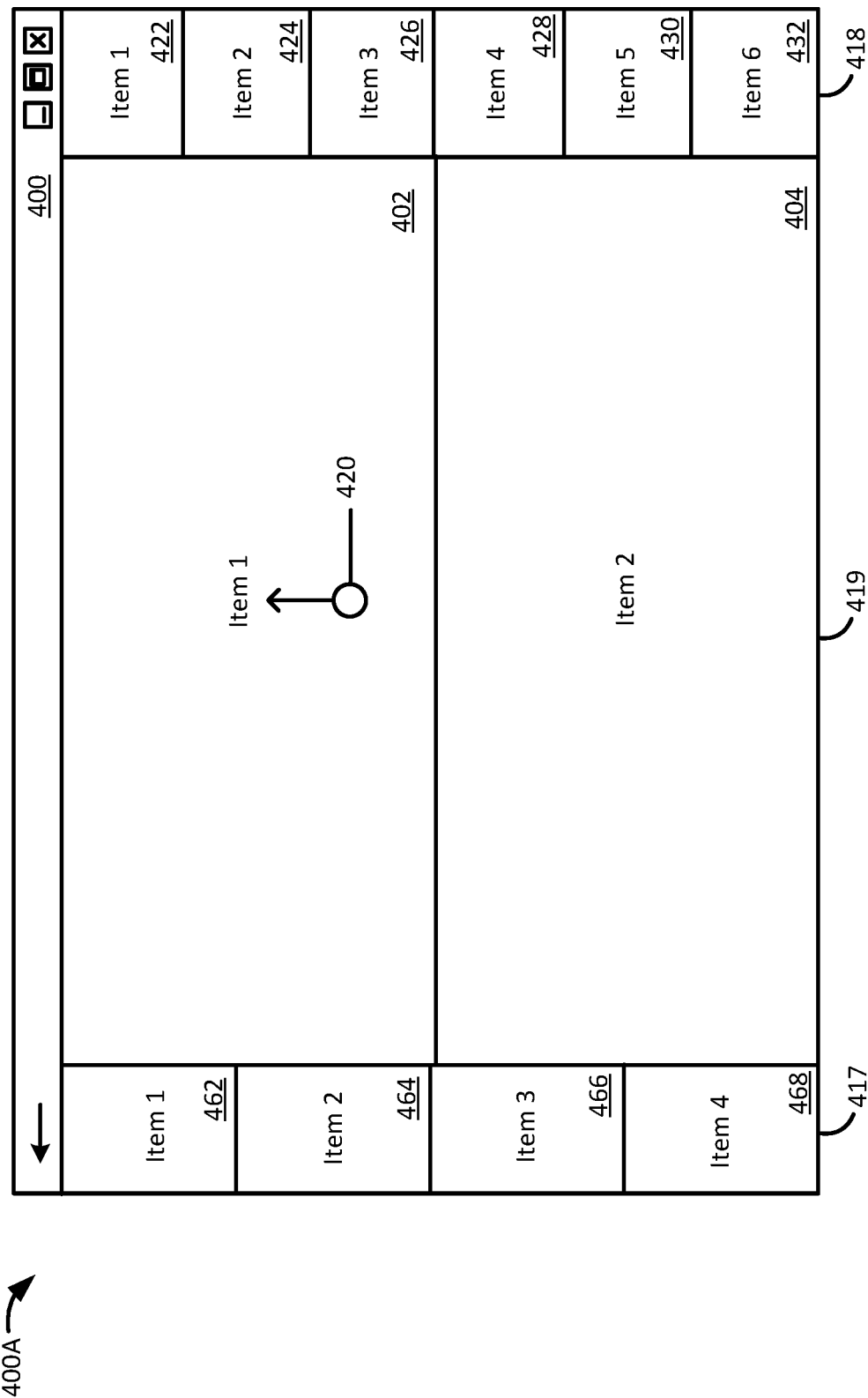
FIG. 4A illustrates one view in a progression of views an application displayed in a user interface of a client computing device, according to an example aspect.

FIG. 4A illustrates one view 400A in a progression of views of an application 400 displayed in a user interface of the client computing device 104, such as a desktop computer, tablet computer or a mobile phone, for example. The view 400A of the application 400 is an example of a view a user may encounter when interacting with the application 400. As discussed above herein, the application 400 may include an application such as a word processing application, spreadsheet application, electronic slide presentation application, email application, chat application, voice application, a browser application, and the like. As illustrated, the exemplary view 400A of the application 400 includes a first column 418, a second column 419, and a third column 417. The second column 419 is displayed and/or rendered adjacent to the first column 418. The third column 417 is displayed and/or rendered adjacent to the second column 419. In the example illustrated in FIG. 4A, the first column 418 includes one or more content previews 422, 424, 426, 428, 430, and 432. The first content preview 422 may include item 1, the second content preview 424 may include item 2, the third content preview 426 may include item 3, the fourth content preview 428 may include item 4, the fifth content preview 430 may include item 5, and the sixth content preview 432 may include item 6. The one or more content previews 422, 424, 426, 428, 430, and 432 (e.g., items 1, 2, 3, 4, 5, and 6) may include any type of content described herein such as files, folders, web pages, links to external resources, rich media (e.g., images, pictures, and video), tasks, text, emails, and the like.

In the example illustrated in FIG. 4A, the second column 419 includes detail content 402 and 404. The detail content 402 may include item 1 and the detail content 404 may include item 2. The detail content 402, 404 (e.g., items 1 and 2) may include any type of content described herein such as files, folders, web pages, links to external resources, rich media (e.g., images, pictures, and video), tasks, text, emails, and the like. In one example, the detail content 402 corresponds to the first content preview 422 and the detail content 404 corresponds to the second content preview 424. In this regard, the detail content 402 is a larger, more detailed version of the first content preview 422 and the detail content 404 is a larger, more detailed version of the second content preview 424. In the example illustrated in FIG. 4A, at least a portion of the detail content (e.g., 402, 404) corresponds to at least two of the one or more content previews (e.g., 422, 424).

In the example illustrated in FIG. 4A, the third column 417 includes neutral content 462, 464, 466, and 468. The neutral content 462 may include item 1, the neutral content 464 may include item 2, the neutral content 466 may include item 3, and the neutral content 468 may include item 4. The neutral content 462, 464, 466, 468 (e.g., items 1, 2, 3, and 4) may include any type of content described herein such as files, folders, web pages, links to external resources, rich media (e.g., images, pictures, and video), tasks, text, emails, and the like. In one example, the neutral content 462 corresponds to the detail content 402 and the neutral content 464 corresponds to the detail content 404. In another example, the neutral content 462 corresponds to one or both of the detail content 402 and the first content preview 422 and the neutral content 464 corresponds to one or both of the detail content 404 and the second content preview 424. In one example, the neutral content 466 corresponds to the third content preview 426. In another example, the neutral content 468 corresponds to the fourth content preview 428. In this regard, the neutral content is a medium size version of the detail content and the one or more content previews (e.g., the neutral content is smaller than the detail content and larger than the one or more content previews). For example, the neutral content 462 is a medium size version of the detail content 402 and the first content preview 422 (e.g., the neutral content 462 is smaller than the detail content 402 and larger than the first content preview 422).

In another example, the detail content corresponds to one or both of the one or more content previews and the neutral content. In another example, the one or more content previews corresponds to one or both of the detail content and the neutral content. As illustrated in FIG. 4A, an input 420 corresponding to a portion of the detail content 402 may be received. In the example illustrated in FIG. 4A, the input is a moving input in a vertical direction (e.g., a swiping gesture going up). When the moving input 420 corresponding to a portion of the detail content 402 is detected, the one or more content previews 422, 424, 426, 428, 430, and 432 (e.g., items 1, 2, 3, 4, 5, and 6), the detail content 402, 404 (e.g., items 1 and 2), and the neutral content 462, 464, 466, 468 (e.g., items 1, 2, 3, and 4) are scrolled across the user interface to the application 400, as illustrated in FIG. 4B.

Figure 4B:
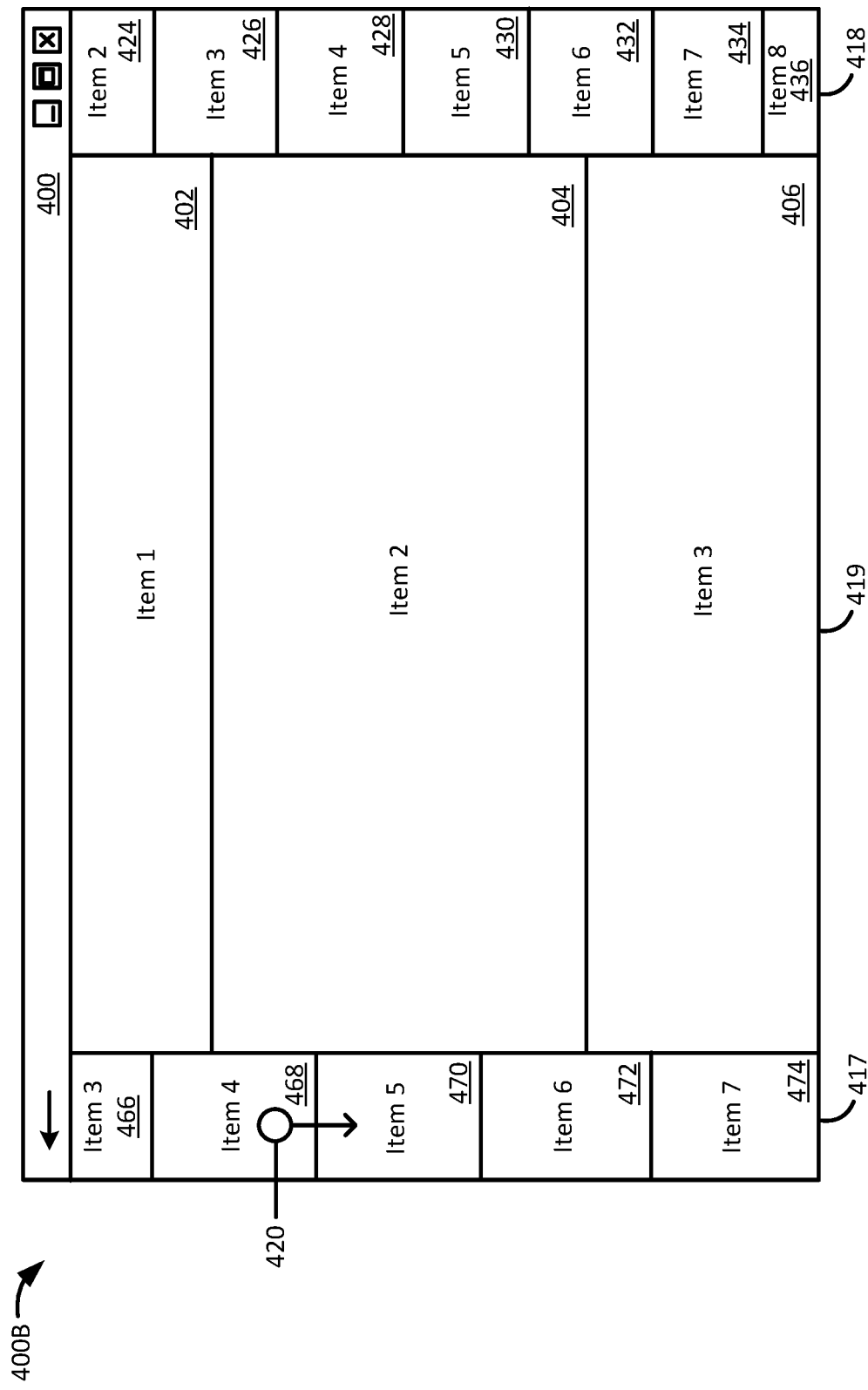
FIG. 4B illustrates another view in a progression of views of the application of FIG. 4A, according to an example aspect.

FIG. 4B illustrates another view 400B in a progression of views of the application 400 of FIG. 4A, displayed in a user interface of the client computing device 104, such as a desktop computer, tablet computer or a mobile phone, for example. The view 400B of the application 400 is an example of a view a user may encounter when interacting with the application 400. As illustrated, the exemplary view 400B of the application 400 includes the first column 418, the second column 419, and the third column 417. In the example illustrated in FIG. 4B, the first column 418 includes one or more content previews 424, 426, 428, 430, 432, 434, and 436. The one or more content previews 424, 426, 428, 430, and 432 are the same content previews illustrated and described relative to FIG. 4A. The first column 418 includes additional content previews 434 and 4336. Content preview 434 includes item 7 and content preview 436 includes item 8. As such, a portion of the one or more content previews has been scrolled across the user interface to the application 400 such that new content (e.g., content previews 434, 436) is viewable in the user interface as old content (e.g., content preview 422) is no longer viewable in the user interface. The content previews 434, 436 (e.g., items 7, 8) may include any type of content described herein such as files, folders, web pages, links to external resources, rich media (e.g., images, pictures, and video), tasks, text, emails, and the like.

In the example illustrated in FIG. 4B, the second column 419 includes detail content 402, 404, and 406. The detail content 402 and 404 is the same detail content illustrated and described relative to FIG. 4A. The second column 419 includes additional detail content 406. The detail content 406 includes item 3. As such, a portion of the detail content has been scrolled across the user interface to the application 400 such that new content (e.g., detail content 406) is viewable in the user interface. The detail content 406 (e.g., item 3) may include any type of content described herein such as files, folders, web pages, links to external resources, rich media (e.g., images, pictures, and video), tasks, text, emails, and the like. As described relative to FIG. 4A, in one example, the detail content 402 corresponds to the first content preview 422 and the detail content 404 corresponds to the second content preview 424. In another example, the detail content 406 corresponds to the third content preview 426. In this regard, the detail content 406 is a larger, more detailed version of the third content preview 426. In the example illustrated in FIG. 4B, at least a portion of the detail content (e.g., 402, 404, 406) corresponds to at least three of the one or more content previews (e.g., 422, 424, 426).

In the example illustrated in FIG. 4B, the third column 417 includes neutral content 466, 468, 470, 472, and 474. The neutral content 466 and 468 is the same neutral content illustrated and described relative to FIG. 4A. The third column 417 includes additional neutral content 470, 472 and 474. The neutral content 470 includes item 5, the neutral content 472 includes item 6, and the neutral content 474 includes item 7. As such, a portion of the neutral content has been scrolled across the user interface to the application 400 such that new content (e.g., content previews 470, 472, and 474) is viewable in the user interface as old content (e.g., content preview 462, 464) is no longer viewable in the user interface. The neutral content 470, 472, and 474 (e.g., items 5, 6, and 7) may include any type of content described herein such as files, folders, web pages, links to external resources, rich media (e.g., images, pictures, and video), tasks, text, emails, and the like.

In some examples, a portion of the one or more content previews, a portion of the detail content, and/or a portion of the neutral content may be viewable while a portion of the one or more content previews, a portion of the detail content, and/or a portion of the neutral content may not be viewable. For example, as illustrated in FIG. 4B, a portion of the detail content 402 is viewable while a portion of the detail content 402 is not viewable and a portion of the detail content 406 is viewable while a portion of the detail content 406 is not viewable. As further illustrated in FIG. 4B, a portion of the content preview 424 is viewable while a portion of the content preview 424 is not viewable and a portion of the content preview 436 is viewable while a portion of the content preview 436 is not viewable. As further illustrated in FIG. 4B, a portion of the neutral content 466 is viewable while a portion of the neutral content 466 is not viewable. As illustrated in FIG. 4B, an input 420 corresponding to a portion of the neutral content 468 may be received. In the example illustrated in FIG. 4B, the input is a moving input in a vertical direction (e.g., a swiping gesture going down). When the moving input 420 corresponding to a portion of the neutral content 466 is detected, the one or more content previews 424, 426, 428, 430, 432, 434, and 436 (e.g., items 2, 3, 4, 5, 6, 7, and 8), the detail content 402, 404, 406 (e.g., items 1, 2, and 3), and the neutral content 466, 468, 470, 472, 474 (e.g., items 3, 4, 5, 6, and 7) are scrolled across the user interface to the application 400, as illustrated in FIG. 4C.

Figure 4C:
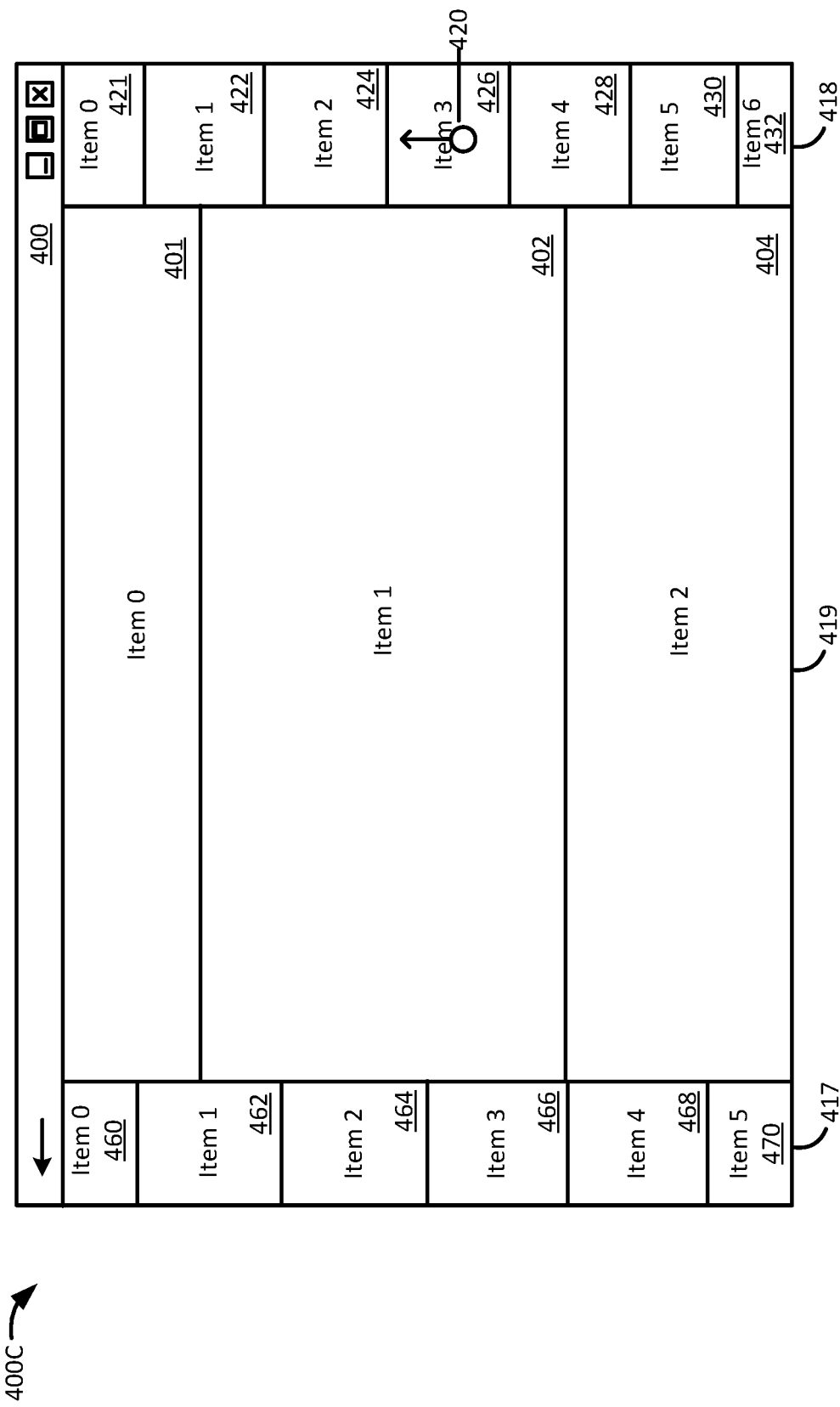
FIG. 4C illustrates another view in the progression of views of the application of FIG. 4A, according to an example aspect.

FIG. 4C illustrates another view 400C in a progression of views of the application 400 of FIG. 4A, displayed in a user interface of the client computing device 104, such as a desktop computer, tablet computer or a mobile phone, for example. The view 400C of the application 400 is an example of a view a user may encounter when interacting with the application 400. As illustrated, the exemplary view 400C of the application 400 includes the first column 418, the second column 419, and the third column 417. In the example illustrated in FIG. 4C, the first column 418 includes one or more content previews 421, 422, 424, 426, 428, 430, and 432. The one or more content previews 424, 426, 428, 430, and 432 are the same content previews illustrated and described relative to FIG. 4B. The first column 418 includes additional content previews 421 and 422. Content preview 421 includes item 0 and content preview 422 includes item 1. As such, a portion of the one or more content previews has been scrolled across the user interface to the application 400 such that new content (e.g., content previews 421 and 422) is viewable in the user interface as old content (e.g., content preview 434, 436) is no longer viewable in the user interface. The content previews 421 and 422 (e.g., items 0, 1) may include any type of content described herein such as files, folders, web pages, links to external resources, rich media (e.g., images, pictures, and video), tasks, text, emails, and the like.

In the example illustrated in FIG. 4C, the second column 419 includes detail content 401, 402, and 404. The detail content 402 and 404 is the same detail content illustrated and described relative to FIG. 4B. The second column 419 includes additional detail content 401. The detail content 401 includes item 0. As such, a portion of the detail content has been scrolled across the user interface to the application 400 such that new content (e.g., detail content 401) is viewable in the user interface as old content (e.g., detail content 406) is no longer viewable in the user interface. The detail content 401 (e.g., items 0) may include any type of content described herein such as files, folders, web pages, links to external resources, rich media (e.g., images, pictures, and video), tasks, text, emails, and the like. In one example, the detail content 401 corresponds to the content preview 421. In this regard, the detail content 401 is a larger, more detailed version of the content preview 421.

In the example illustrated in FIG. 4C, the third column 417 includes neutral content 460, 462, 464, 466, 468, and 470. The neutral content 466, 468, and 470 is the same detail content illustrated and described relative to FIG. 4B. The third column 417 includes additional neutral content 460, 462, and 464. The neutral content 460 includes item 0, the neutral content 462 includes item 1 and the neutral content 464 includes item 2. As such, a portion of the neutral content has been scrolled across the user interface to the application 400 such that new content (e.g., neutral content 460, 462, and 464) is viewable in the user interface as old content (e.g., neutral content 472, 474) is no longer viewable in the user interface. The neutral content 460, 462, and 464 (e.g., items 0, 1, 2) may include any type of content described herein such as files, folders, web pages, links to external resources, rich media (e.g., images, pictures, and video), tasks, text, emails, and the like. As illustrated in FIG. 4C, an input 420 corresponding to a portion of the content preview 426 may be received. In the example illustrated in FIG. 4C, the input is a moving input in a vertical direction (e.g., a swiping gesture going up). When the moving input 420 corresponding to a portion of the content preview 426 is detected, the one or more content previews 421, 422, 424, 426, 428, 430, and 432 (e.g., items 0, 1, 2, 3, 4, 5, and 6), the detail content 401, 402, 404 (e.g., items 0, 1, and 2), and the neutral content 460, 462, 464, 466, 468, 470 (e.g., items 0, 1, 2, 3, 4, and 5) are scrolled across the user interface to the application 400, as illustrated in FIG. 4D.

Figure 4D:
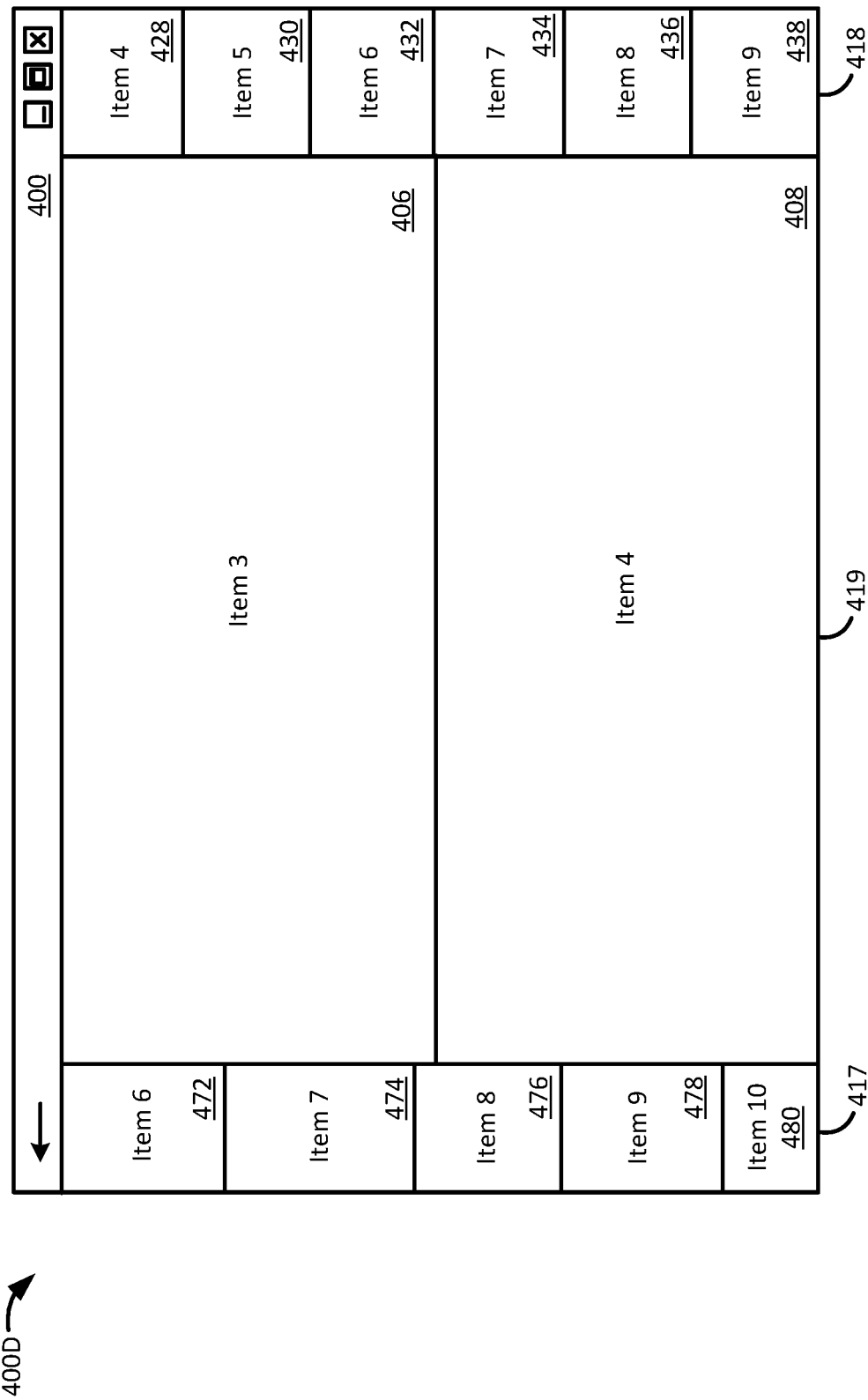
FIG. 4D illustrates another view in the progression of views of the application of FIG. 4A, according to an example aspect.

FIG. 4D illustrates another view 400D in a progression of views of the application 400 of FIG. 4A, displayed in a user interface of the client computing device 104, such as a desktop computer, tablet computer or a mobile phone, for example. The view 400D of the application 400 is an example of a view a user may encounter when interacting with the application 400. As illustrated, the exemplary view 400D of the application 400 includes the first column 418, the second column 419, and the third column 417. In the example illustrated in FIG. 4D, the first column 418 includes one or more content previews 428, 430, 432, 434, 436, and 438. The one or more content previews 428, 430, and 432 are the same content previews illustrated and described relative to FIG. 4C. The first column 418 includes additional content previews 434, 436, and 438. Content preview 434 includes item 7, content preview 436 includes item 8, and content preview 438 includes item 9. As such, a portion of the one or more content previews has been scrolled across the user interface to the application 400 such that new content (e.g., content previews 434, 436, and 438) is viewable in the user interface as old content (e.g., content preview 421, 422, 424, and 426) is no longer viewable in the user interface. The content previews 434, 436, and 438 (e.g., items 7, 8, 9) may include any type of content described herein such as files, folders, web pages, links to external resources, rich media (e.g., images, pictures, and video), tasks, text, emails, and the like.

In the example illustrated in FIG. 4D, the second column 419 includes detail content 406 and 408. The second column 419 includes additional detail content 406 and 408. The detail content 406 includes item 3 and the detail content 406 includes item 4. As such, a portion of the detail content has been scrolled across the user interface to the application 400 such that new content (e.g., detail content 406 and 408) is viewable in the user interface as old content (e.g., detail content 401, 402, and 404) is no longer viewable in the user interface. The detail content 406 and 408 (e.g., items 3, 4) may include any type of content described herein such as files, folders, web pages, links to external resources, rich media (e.g., images, pictures, and video), tasks, text, emails, and the like.

In the example illustrated in FIG. 4D, the third column 417 includes neutral content 472, 474, 476, 478, and 480. The third column 417 includes additional neutral content 472, 474, 476, 478, and 480. The neutral content 472 includes item 6, the neutral content 474 includes item 7, the neutral content 476 includes item 8, the neutral content 478 includes item 9, and the neutral content 480 includes item 10. As such, a portion of the neutral content has been scrolled across the user interface to the application 400 such that new content (e.g., neutral content 472, 474, 476, 478, and 480) is viewable in the user interface as old content (e.g., neutral content 460, 462, 464, 466, 468, and 470) is no longer viewable in the user interface. The neutral content 472, 474, 476, 478, and 480 (e.g., 6, 7, 8, 9, and 10) may include any type of content described herein such as files, folders, web pages, links to external resources, rich media (e.g., images, pictures, and video), tasks, text, emails, and the like.

Figure 5A:
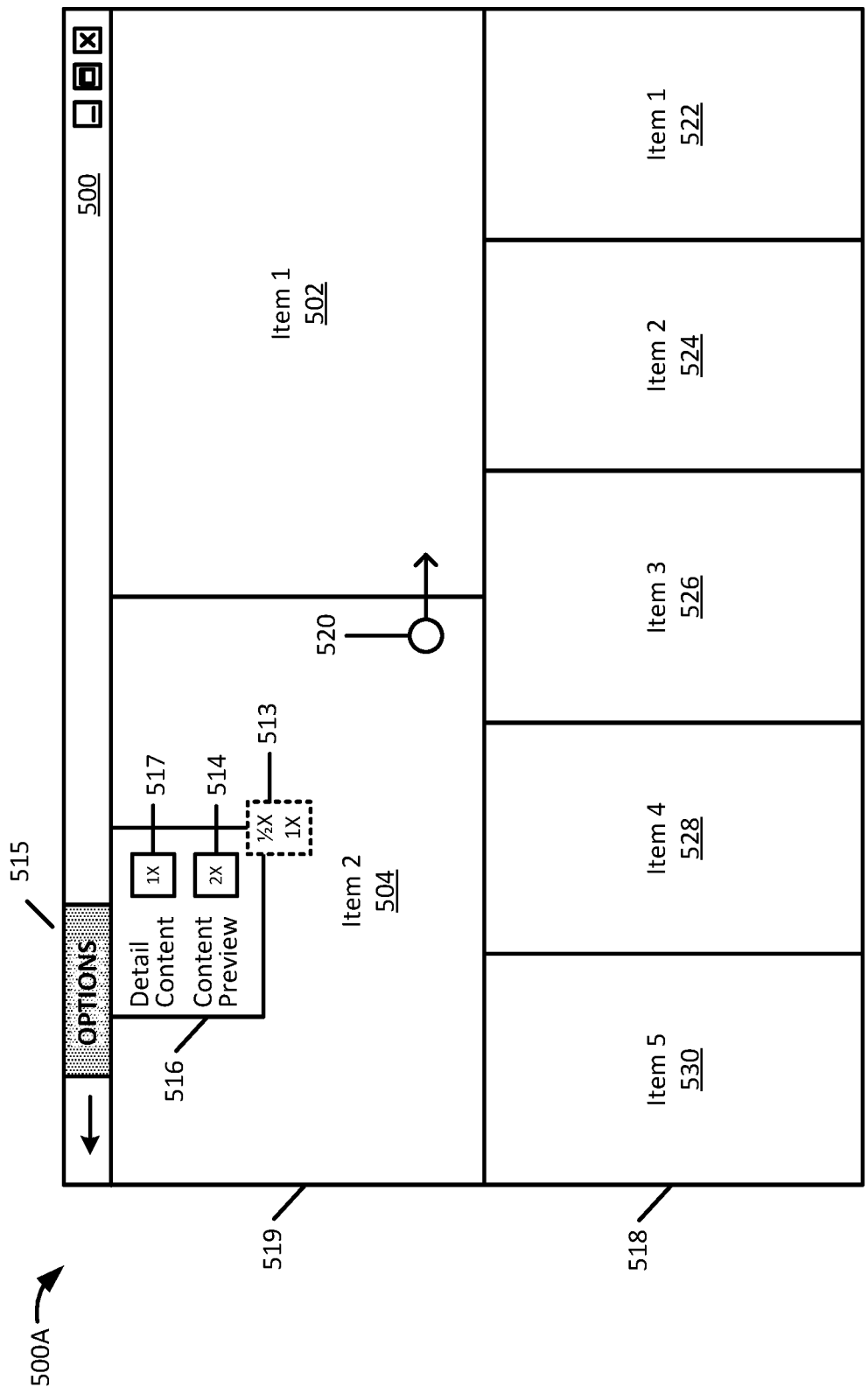
FIG. 5A illustrates one view in a progression of views an application displayed in a user interface of a client computing device, according to an example aspect.

FIG. 5A illustrates one view 500A in a progression of views of an application 500 displayed in a user interface of the client computing device 104, such as a desktop computer, tablet computer or a mobile phone, for example. The view 500A of the application 500 is an example of a view a user may encounter when interacting with the application 500. As discussed above herein, the application 500 may include an application such as a word processing application, spreadsheet application, electronic slide presentation application, email application, chat application, voice application, a browser application, and the like. As illustrated, the exemplary view 500A of the application 500 includes a first row 518 and a second row 519. In the example illustrated in FIG. 5A, the first column 518 includes one or more content previews 522, 524, 526, 528, and 530. The first content preview 522 may include item 1, the second content preview 524 may include item 2, the third content preview 526 may include item 3, the fourth content preview 528 may include item 4, and the fifth content preview 530 may include item 5. The one or more content previews 522, 524, 526, 528, and 530 (e.g., items 1, 2, 3, 4, and 5) may include any type of content described herein such as files, folders, web pages, links to external resources, rich media (e.g., images, pictures, and video), tasks, text, emails, and the like.

In the example illustrated in FIG. 5A, the second row 519 includes detail content 502 and 504. The detail content 502 may include item 1 and the detail content 504 may include item 2. The detail content 502, 504 (e.g., items 1 and 2) may include any type of content described herein such as files, folders, web pages, links to external resources, rich media (e.g., images, pictures, and video), tasks, text, emails, and the like. In one example, the detail content 502 corresponds to the first content preview 522 and the detail content 504 corresponds to the second content preview 524. In this regard, the detail content 502 is a larger, more detailed version of the first content preview 522 and the detail content 504 is a larger, more detailed version of the second content preview 524. In the example illustrated in FIG. 5A, at least a portion of the detail content (e.g., 502, 504) corresponds to at least two of the one or more content previews (e.g., 522, 524).

As illustrated in FIG. 5A, the view 500A of the application 500 includes an options button 515. In one example, in response to receiving an input (e.g., a selection of) corresponding to the option button 515, user preference options 514 and 517 are displayed in a scroll speed menu 516 for tuning at least a content preview scroll speed and a detail content scroll speed, as described herein. As illustrated in FIG. 5A, the user preference option 514 includes the content preview scroll speed and is set to 2× and the user preference option 517 includes the detail content scroll speed and is set to 1×. In one example, as illustrated n FIG. 5A, when a user selects user preference option 514 and/or user preference option 517, a plurality of scroll speeds 513 to select from may be displayed. In this regard, a user may tune, adjust, and/or set the scroll speed and/or the interrelationship between scroll speeds for the one or more content previews, the detail content, and the neutral content. As illustrated in FIG. 5A, an input 520 corresponding to a portion of the detail content 504 may be received. In the example illustrated in FIG. 5A, the input is a moving input in a horizontal direction (e.g., a swiping gesture to the right). When the moving input 520 corresponding to a portion of the detail content 504 is detected, the one or more content previews 522, 524, 526, 528, and 530 (e.g., items 1, 2, 3, 4, and 5) and the detail content 502, 504 (e.g., items 1 and 2) are scrolled across the user interface to the application 500, as illustrated in FIG. 5B.

Figure 5B:
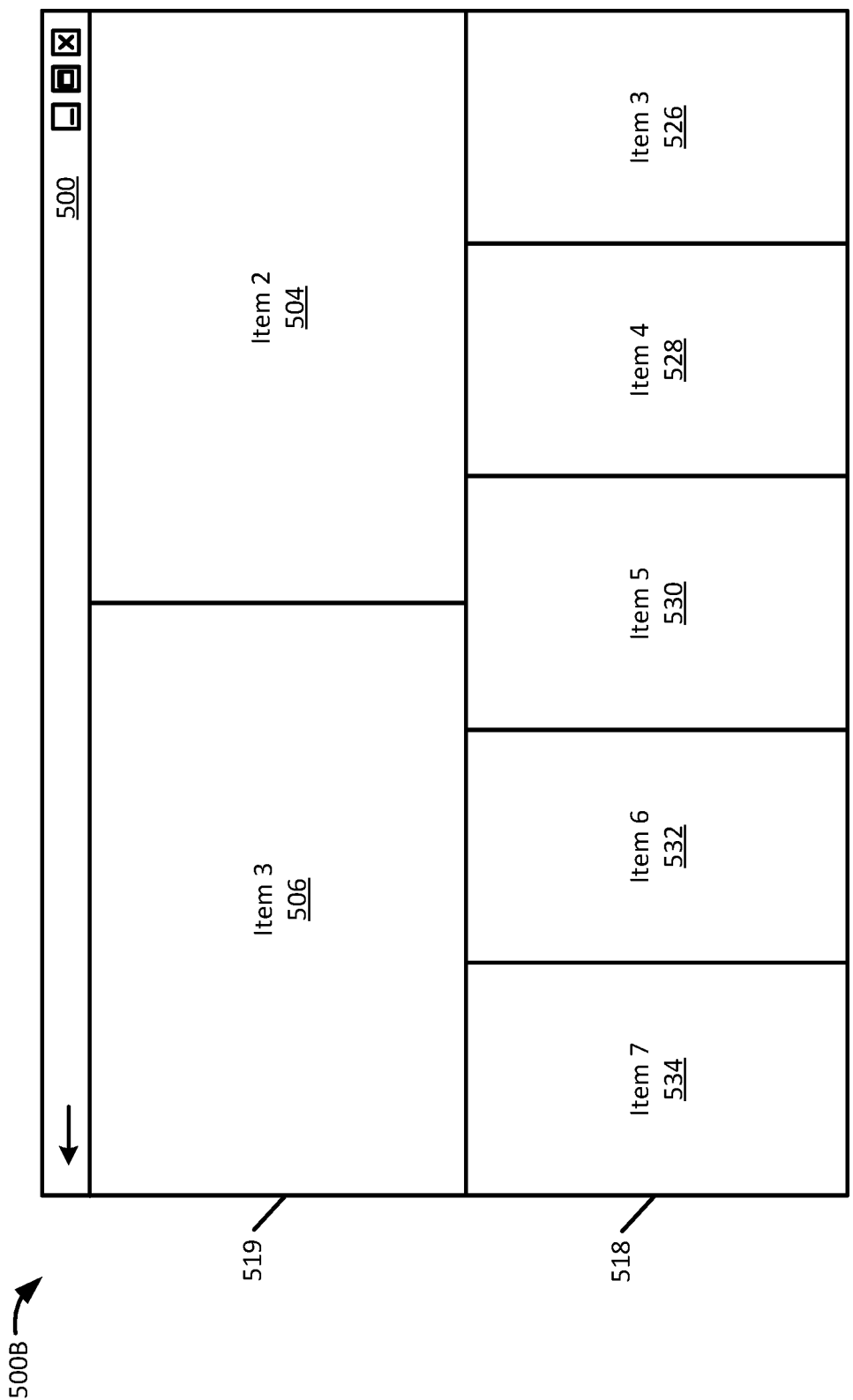
FIG. 5B illustrates another view in a progression of views of the application of FIG. 5A, according to an example aspect.

FIG. 5B illustrates another view 500B in a progression of views of the application 500 of FIG. 5A, displayed in a user interface of the client computing device 104, such as a desktop computer, tablet computer or a mobile phone, for example. The view 500B of the application 500 is an example of a view a user may encounter when interacting with the application 500. As illustrated, the exemplary view 500B of the application 500 includes the first row 518 and the second row 519. In the example illustrated in FIG. 5B, the first row 518 includes one or more content previews 526, 528, 530, 532, and 534. The one or more content previews 526, 528, and 530 are the same content previews illustrated and described relative to FIG. 5A. The first row 518 includes additional content previews 532 and 534. Content preview 532 includes item 6 and content preview 534 includes item 7. As such, a portion of the one or more content previews has been scrolled across the user interface to the application 500 such that new content (e.g., content previews 532 and 534) is viewable in the user interface as old content (e.g., content preview 522, 524) is no longer viewable in the user interface. The content previews 532, 534 (e.g., items 6, 7) may include any type of content described herein such as files, folders, web pages, links to external resources, rich media (e.g., images, pictures, and video), tasks, text, emails, and the like.

In the example illustrated in FIG. 5B, the second row 519 includes detail content 504 and 506. The detail content 504 is the same detail content illustrated and described relative to FIG. 5A. The second row 519 includes additional detail content 506. The detail content 506 includes item 3. As such, a portion of the detail content has been scrolled across the user interface to the application 500 such that new content (e.g., detail content 506) is viewable in the user interface as old content (e.g., detail content 502) is no longer viewable in the user interface. The detail content 506 (e.g., item 3) may include any type of content described herein such as files, folders, web pages, links to external resources, rich media (e.g., images, pictures, and video), tasks, text, emails, and the like. In one example, the detail content 506 corresponds to the third content preview 526. In this regard, the detail content 506 is a larger, more detailed version of the third content preview 526.

Figure 6:
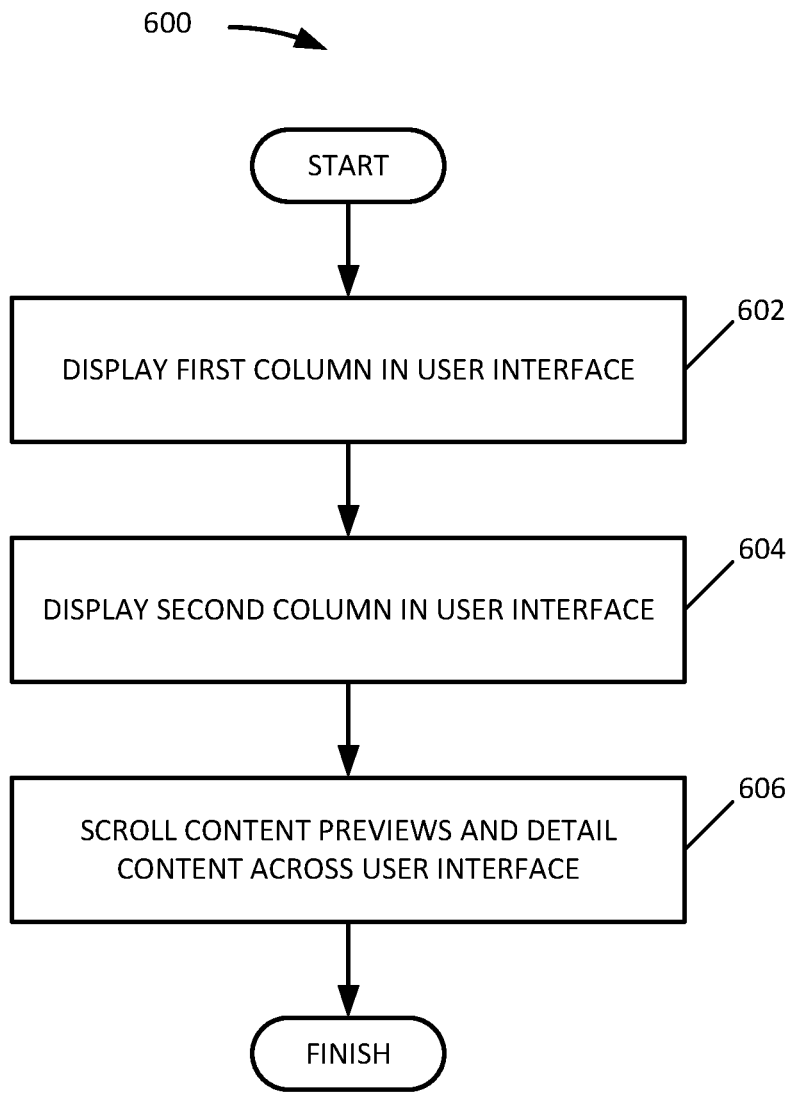
FIG. 6 illustrates an exemplary method for using content as navigation in an application, according to an example aspect.

Referring now to FIG. 6, an exemplary method 600 for using content as navigation in an application, according to an example aspect is shown. Method 600 may be implemented on a computing device or a similar electronic device capable of executing instructions through at least one processor. For example, the software application may be one of an email application, a social networking application, project management application, a collaboration application, an enterprise management application, a messaging application, a word processing application, a spreadsheet application, a database application, a presentation application, a contacts application, a calendaring application, etc. This list is exemplary only and should not be considered as limiting. Any suitable application for facilitating the use of content as navigation may be utilized by method 600, including combinations of the above-listed applications.

Method 600 may begin at operation 602, where a first column comprising one or more content previews may be displayed as a first scroll bar in a user interface to an application. For example, the one or more content previews and/or a portion of the one or more content previews may be scrolled across the user interface using the one or more content previews itself. For example, the content may be moved across (e.g., up, down, right, and left) the user interface display to the application such that new content is viewable in the user interface as old content is no longer viewable (e.g., disappears) in the user interface. In one example, the first scroll bar includes a content preview scroll speed. The content preview scroll speed may be the speed at which the one or more content previews scroll across the user interface. In one example the first column is displayed in a right portion of the user interface to the application. In another example, the first column is displayed in a center portion of the user interface to the application. In yet another example, the first column is displayed in a left portion of the user interface to the application.

When a first column comprising one or more content previews is displayed as a first scroll bar in a user interface to an application, flow proceeds to operation 604 where a second column comprising detail content is displayed as a second scroll bar in the user interface to the application. In one example, the second column is displayed adjacent to the first column. In one example, the detail content and/or a portion of the detail content may be scrolled across the user interface using the detail content itself. In another example, the detail content and/or a portion of the detail content may be scrolled across the user interface using the one or more content previews and/or a portion of the one or more content previews. In another example, the one or more content previews and/or a portion of the one or more content previews may be scrolled across the user interface using the detail content. In one example the second column is displayed in a right portion of the user interface to the application. In another example, the second column is displayed in a center portion of the user interface to the application. In yet another example, the second column is displayed in a left portion of the user interface to the application.

When a second column comprising detail content is displayed as a second scroll bar in the user interface to the application, flow proceeds to operation 606 where in response to receiving a moving input corresponding to a portion of the first scroll bar, the one or more content previews and the detail content are scrolled across the user interface. In one example, a moving input may include a touch gesture such as tapping the screen and swiping in a direction across the screen. In another example, a moving input may include contacting the screen using a cursor, for example. In this regard, contact may include placing a cursor on the user interface using a device such as a mouse and moving the cursor in a direction across the screen. In one example, the moving input is in a vertical direction. In this regard, the content may be scrolled up or down. In another example, the moving input is in a horizontal direction. In this regard, the content may be scrolled right or left. In one example, in response to receiving a moving input corresponding to a portion of the second scroll bar, the one or more content previews and the detail content are scrolled across the user interface.

The term rendering as used herein generally refers to the various capabilities employed in various computing architectures to assemble information that can then be used by other capabilities to generate an image or images. Rendering a first column, for example, generally refers to assembling the information or data used to generate an image or images that together result in the column including content. Animation or other dynamics may also be used to achieve certain effects.

However, it may be appreciated that other perspectives on rendering may be considered within the scope of the present disclosure. For example, rendering as used herein may also, in some scenarios, be considered to refer to the various capabilities employed by various computing architectures to generate an image or images from information assembled for that purpose. Rendering a column may refer to generating an image or images, from information assembled for that purpose, that together result in the column, which can then be displayed.

It may also be appreciated that rendering in some scenarios may refer to a combination of the aforementioned possibilities. For example, rendering in some scenarios may refer to both assembling the information used to generate an image or images for a column including content and then generating the image or images of the column. In addition, a wide variety of other steps, processes, and stages may occur within the context of presenting views of an application, all of which may be considered part of presenting a view.

Figure 7:
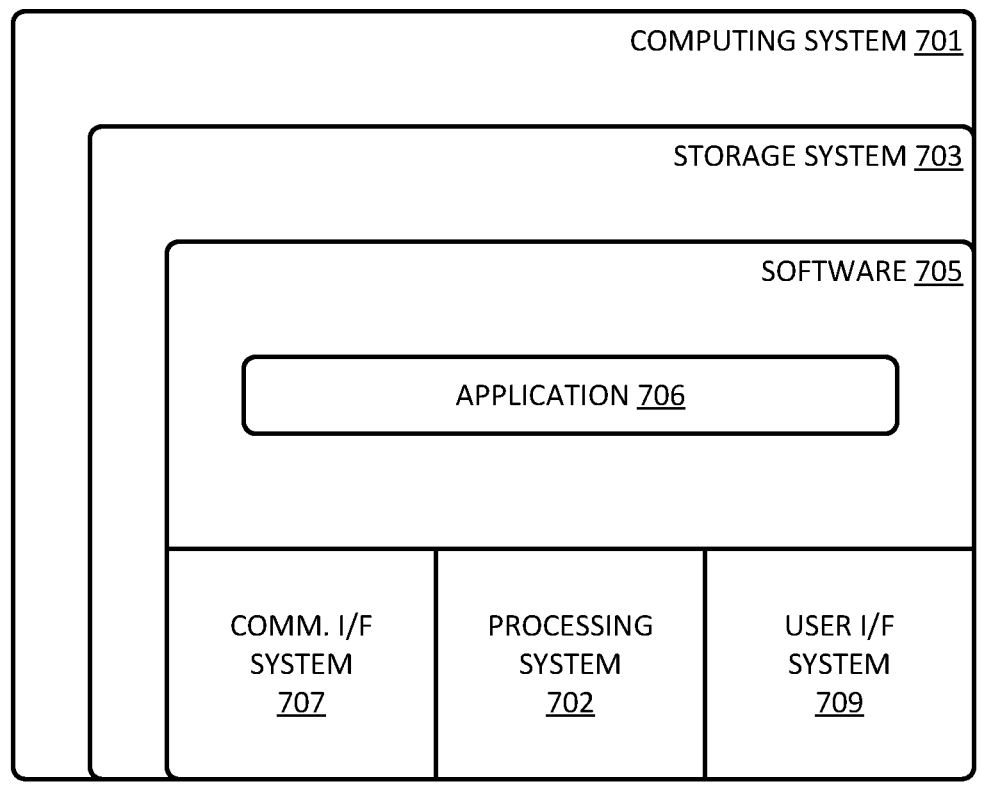
FIG. 7 illustrates a computing system suitable for implementing the enhanced content navigation technology disclosed herein, including any of the environments, architectures, elements, processes, user interfaces, and operational scenarios and sequences illustrated in the Figures and discussed below in the Technical Disclosure.

FIG. 7 illustrates computing system 701 that is representative of any system or collection of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes application 706, which is representative of the applications discussed with respect to the preceding FIGS. 1-6. When executed by processing system 702 to enhance content navigation, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing enhanced application content navigation.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include application 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to facilitate enhanced application content navigation. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising: one or more computer readable storage media; and program instructions stored on the one or more computer readable storage media that, when executed by at least one processor, cause the at least one processor to at least: initiate rendering of a first column comprising one or more content previews in a user interface to an application; initiate rendering of a second column comprising detail content corresponding to at least one of the one or more content previews in the user interface to the application; and scroll the one or more content previews and the detail content across the user interface when a moving input corresponding to a portion of the one or more content previews or a portion of the detail content is detected. In further examples, the moving input is in a vertical direction. In further examples, the moving input is in a horizontal direction. In further examples, at least a portion of the detail content corresponds to at least two of the one or more content previews. In further examples, the one or more content previews include a content preview scroll speed, and wherein the detail content includes a detail content scroll speed. In further examples, the content preview scroll speed is four times the detail content scroll speed. In further examples, the content preview scroll speed is two times the detail content scroll speed. In further examples, the program instructions, when executed by the at least one processor, further cause the at least one processor to display user preference options in a scroll speed menu for tuning at least the content preview scroll speed and the detail content scroll speed.

Further aspects disclosed herein provide an exemplary method for using content as navigation in an application, the method comprising: displaying a first column comprising one or more content previews as a first scroll bar in a user interface to the application; displaying, adjacent to the first column, a second column comprising detail content as a second scroll bar in the user interface to the application; in response to receiving a moving input corresponding to a portion of the first scroll bar, scrolling the one or more content previews and the detail content across the user interface. In further examples, the detail content corresponds to at least one of the one or more content previews. In further examples, the computer-implemented method further comprises in response to receiving a moving input corresponding to a portion of the second scroll bar, scrolling the one or more content previews and the detail content across the user interface. In further examples, the computer-implemented method further comprises displaying, adjacent to the second column, a third column comprising neutral content as a third scroll bar in the user interface to the application. In further examples, the method further comprises in response to receiving a moving input corresponding to a portion of the third scroll bar, scrolling the one or more content previews, the detail content, and the neutral content across the user interface. In further examples, the neutral content corresponds to at least one of the one or more content previews and at least a portion of the detail content. In further examples, the first scroll bar includes a content preview scroll speed, wherein the second scroll bar includes a detail content scroll speed, and wherein the third scroll bar includes a neutral content scroll speed. In further examples, the detail content scroll speed is half the neutral content scroll speed, and wherein the content preview scroll speed is two times the neutral content scroll speed.

Additional aspects disclosed herein provide an exemplary computing apparatus comprising: one or more computer readable storage media; and an application embodied at least in part in program instructions stored on the one or more computer readable storage media and comprising: a first scroll bar through which to display one or more content previews in a user interface to the application; a second scroll bar through which to display detail content corresponding to at least one of the one or more content previews in the user interface to the application; and a third scroll bar through which to display neutral content in the user interface to the application. In further examples, in response to receiving a moving input corresponding to a portion of at least one of the first scroll bar, the second scroll bar, and the third scroll bar, the one or more content previews, the detail content, and the neutral content are scrolled across the user interface. In further examples, the moving input is in at least one of a vertical direction or a horizontal direction. In further examples, the first scroll bar includes a content preview scroll speed, wherein the second scroll bar includes a detail content scroll speed, and wherein the third scroll bar includes a neutral content scroll speed.

Techniques for using content as navigation in an application are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of content navigation systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:
1. A system comprising:
one or more computer readable storage media; and
program instructions stored on the one or more computer readable storage media that, when executed by at least one processor, cause the at least one processor to at least:
initiate rendering, as a first scroll bar in a user interface to an application, of a first column comprising content previews;
initiate rendering, as a second scroll bar in the user interface, of a second column comprising detailed content corresponding to the content previews, wherein a portion of the detailed content corresponds to one of the content previews, and wherein a second portion of the detailed content corresponds to a second one of the content previews;
in response to detecting a moving input applied to the first column:
scroll the content previews in a direction of the moving input applied to the first column such that the one of the content previews is no longer present in the user interface; and
scroll the detailed content in the direction of the moving input applied to the first column such that the portion of the detailed content corresponding to the one of the content previews remains present in the user interface; and
in response to detecting a moving input applied to the second column:
scroll the content previews in a direction of the moving input applied to the second column such that the second one of the content previews is no longer present in the user interface; and
scroll the detailed content in the direction of the moving input applied to the second column such that the second portion of the detailed content corresponding to the second one of the content previews remains present in the user interface.

2. The system of claim 1, wherein at least a portion of the detailed content corresponds to at least two of the content previews.

3. The system of claim 1, wherein the content previews include a content preview scroll speed, and wherein the detailed content includes a detailed content scroll speed.

4. The system of claim 3, wherein the content preview scroll speed is four times the detailed content scroll speed.

5. The system of claim 3, wherein the content preview scroll speed is two times the detailed content scroll speed.

6. The system of claim 3, wherein the program instructions, when executed by the at least one processor, further cause the at least one processor to display user preference options in a scroll speed menu for tuning at least the content preview scroll speed and the detailed content scroll speed.

7. The system of claim 3, wherein the program instructions, when executed by the at least one processor, further cause the at least one processor to:
scroll the content previews at the content preview scroll speed; and
scroll the detailed content at the detailed content scroll speed.

8. The system of claim 1, wherein the program instructions, when executed by the at least one processor, further cause the at least one processor to:
initiate rendering, as a third scroll bar in a user interface, a third column comprising neutral content; and
in response to detecting a moving input applied to the third column:
scroll the content previews in a direction of the moving input applied to the third column;

the detailed content in the direction of the moving input applied to the third column; and the neutral content across the user interface in the direction of the moving input applied to the third column.

9. A computer-implemented method for using content as navigation in an application, the method comprising:

enabling display, as a first scroll bar in a user interface to the application, of a first column comprising content previews;

enabling display, as a second scroll bar adjacent to the first column, a second column comprising detailed content corresponding to the content previews, wherein a portion of the detailed content corresponds to one of the content previews, and wherein a second portion of the detailed content corresponds to a second one of the content previews;

in response to detecting a moving input applied to the first column:

scroll the content previews in a direction of the moving input applied to the first column such that the one of the content previews is no longer present in the user interface; and scroll the detailed content in the direction of the moving input applied to the first column such that the portion of the detailed content corresponding to the one of the content previews remains present in the user interface; and in response to detecting a moving input applied to the second column:

scroll the content previews in a direction of the moving input applied to the second column such that the second one of the content previews is no longer present in the user interface; and scroll the detailed content in the direction of the moving input applied to the second column such that the second portion of the detailed content corresponding to the second one of the content previews remains present in the user interface.

10. The computer-implemented method of claim 9, wherein the detailed content corresponds to at least one of the content previews.

11. The computer-implemented method of claim 9, further comprising displaying, adjacent to the second column, a third column comprising neutral content as a third scroll bar in the user interface to the application.

12. The computer-implemented method of claim 11, further comprising in response to receiving a moving input corresponding to a portion of the third scroll bar, scrolling the content previews, the detailed content, and the neutral content across the user interface.

13. The computer-implemented method of claim 11, wherein the neutral content corresponds to at least one of the content previews and at least a portion of the detailed content.

14. The computer-implemented method of claim 11, wherein the first scroll bar includes a content preview scroll speed, wherein the second scroll bar includes a detailed content scroll speed, and wherein the third scroll bar includes a neutral content scroll speed.

15. The computer-implemented method of claim 14, wherein the detailed content scroll speed is half the neutral content scroll speed, and wherein the content preview scroll speed is two times the neutral content scroll speed.

16. The computer-implemented method of claim 14, further comprising:

scrolling the content previews at the content preview scroll speed;

scrolling the detailed content at the detailed content scroll speed; and scrolling the neutral content at the neutral content scroll speed.

17. A computing apparatus comprising:

one or more computer readable storage media; and an application embodied at least in part in program instructions stored on the one or more computer readable storage media and comprising:

a first scroll bar through which to display content previews in a user interface to the application;

a second scroll bar through which to display detailed content corresponding to at least the content previews in the user interface to the application, wherein a portion of the detailed content corresponds to one of the content previews, and wherein a second portion of the detailed content corresponds to a second one of the content previews; and a third scroll bar through which to display neutral content in the user interface to the application; and wherein in response to detecting a moving input applied to the first scroll bar:

scroll the content previews in a direction of the moving input applied to the first scroll bar such that the one of the content previews is no longer present in the user interface;

scroll the detailed content in the direction of the moving input applied to the first scroll bar such that the portion of the detailed content corresponding to the one of the content previews remains present in the user interface; and scroll the neutral content in the direction of the moving input applied to the first scroll bar;

in response to detecting a moving input applied to the second scroll bar:

scroll the content previews in a direction of the moving input applied to the second scroll bar such that the second one of the content previews is no longer present in the user interface;

scroll the detailed content in the direction of the moving input applied to the second scroll bar such that the second portion of the detailed content corresponding to the second one of the content previews remains present in the user interface; and scroll the neutral content in the direction of the moving input applied to the second scroll bar; and in response to detecting a moving input applied to the third scroll bar:

scroll the content previews in a direction of the moving input applied to the third scroll bar;

scroll the detailed content in the direction of the moving input applied to the third scroll bar; and scroll the neutral content in the direction of the moving input applied to the third scroll bar.

18. The computing apparatus of claim 17, wherein the moving input applied to the first scroll bar is in at least one of a vertical direction or a horizontal direction.

19. The computing apparatus of claim 17, wherein the first scroll bar includes a content preview scroll speed, wherein the second scroll bar includes a detailed content scroll speed, and wherein the third scroll bar includes a neutral content scroll speed.

20. The computing apparatus of claim 19, wherein the detailed content scroll speed is half the neutral content scroll speed, and wherein the content preview scroll speed is two times the neutral content scroll speed.

* * * * *